US009485752B2

(12) United States Patent
Nakasato

(10) Patent No.: US 9,485,752 B2
(45) Date of Patent: Nov. 1, 2016

(54) METHOD AND DEVICE FOR SOUNDING SIGNAL ALLOCATION AND SOUNDING ASSISTED BEAMFORMING

(75) Inventor: Yuuki Nakasato, Gifu (JP)

(73) Assignee: Kyocera Corporation, Kyoto (JP)

( * ) Notice: Subject to any disclaimer, the term of this patent is extended or adjusted under 35 U.S.C. 154(b) by 531 days.

(21) Appl. No.: 14/002,437

(22) PCT Filed: Mar. 1, 2012

(86) PCT No.: PCT/IB2012/000674
§ 371 (c)(1),
(2), (4) Date: Aug. 30, 2013

(87) PCT Pub. No.: WO2012/117299
PCT Pub. Date: Sep. 7, 2012

(65) Prior Publication Data
US 2013/0344881 A1 Dec. 26, 2013

(30) Foreign Application Priority Data
Mar. 1, 2011 (JP) ................. 2011-044282

(51) Int. Cl.
H04B 1/38 (2015.01)
H04W 72/04 (2009.01)
H04L 5/00 (2006.01)
H04L 25/02 (2006.01)
H04B 7/08 (2006.01)
(Continued)

(52) U.S. Cl.
CPC .......... *H04W 72/04* (2013.01); *H04B 7/0851* (2013.01); *H04L 5/0023* (2013.01);
(Continued)

(58) Field of Classification Search
CPC ....................................................... H04B 1/38
USPC ............................................. 455/561, 422.1
See application file for complete search history.

(56) References Cited

U.S. PATENT DOCUMENTS

2008/0051145 A1* 2/2008 Jin .................. H04B 7/022
455/561

FOREIGN PATENT DOCUMENTS

JP 4732994 B2 7/2011
WO WO-2008/024570 A2 2/2008
(Continued)

OTHER PUBLICATIONS

International Preliminary Report on Patentability dated Sep. 3, 2013 from International Patent Application No. PCT/IB2012/000674, 8 pages.

(Continued)

Primary Examiner — Charles Appiah
Assistant Examiner — Randy Peaches
(74) Attorney, Agent, or Firm — Duane Morris LLP

(57) ABSTRACT

A communication device and methods are disclosed. A transmission directionality of a plurality of antennas is controlled based on a received previously known signal transmitted from a communication terminal, when a signal to the communication terminal is transmitted. A first upstream radio sub-resource for transmitting the received previously known signal is allocated to a first communication terminal to which a downstream radio resource is to be allocated, and a first upstream radio resource for a first previously known signal comprises the first upstream radio sub-resource. A second upstream radio sub-resource for transmitting the received previously known signal is allocated to a second communication terminal to which a downstream radio resource is not to be allocated, a second upstream radio resource for a second previously known signal comprising the second upstream radio sub-resource.

13 Claims, 18 Drawing Sheets

(51) Int. Cl.
*H04B 7/06* (2006.01)
*H04W 28/04* (2009.01)
*H04W 88/08* (2009.01)

(52) U.S. Cl.
CPC ........ *H04L 5/0048* (2013.01); *H04L 25/0224* (2013.01); *H04B 7/0617* (2013.01); *H04W 28/048* (2013.01); *H04W 88/08* (2013.01)

(56) References Cited

FOREIGN PATENT DOCUMENTS

WO WO-2009/041881 A2 4/2009
WO WO-2010/124241 A2 10/2010

OTHER PUBLICATIONS

Catt, "Uplink Sounding Reference Signals for TDD with Alternative Frame Structure," R1-071879, 3rd Generation Partnership Project (3GPP), Apr. 17, 2007, Beijing, China, 3 pages.

Huawei, "Increasing SRS capacity to support UL MIMO," R1-094707, 3rd Generation Partnership Project (3GPP), Nov. 9, 2009, Jeju, South Korea, 4 pages.

International Search Report dated Jul. 23, 2012, from International Patent Application No. PCT/IB2012/000674, 4 pages.

Catt, New POSTCOM, "Signaling and UE behavior for aperiodic SRS," R1-105928, 3rd Generation Partnership Project (3GPP), Nov. 19, 2010, Jacksonville, Florida, 4 pages.

CMCC, "Performance of Transparent MU-BF scheme and Non-transparent MU-BF scheme," R1-093274, 3rd Generation Partnership Project (3GPP), Aug. 28, 2009, Shenzhen, China, 5 pages.

Hijawei, "SRS Subframe Configuration," R1-081786, 3rd Generation Partnership Project (3GPP), May 9, 2008, Kansas City, Missouri, 7 pages.

Office Action dated Jul. 22, 2014 from corresponding Japanese Patent Application No. 2011-044282 (Statement of Relevance included), 3 total pages.

* cited by examiner

Figure 4

| Configuration number | Sub-frame number | | | | | | | | | |
|---|---|---|---|---|---|---|---|---|---|---|
| | 0 | 1 | 2 | 3 | 4 | 5 | 6 | 7 | 8 | 9 |
| 0 | D | S | U | U | U | D | S | U | U | U |
| 1 | D | S | U | U | D | D | S | U | U | D |
| 2 | D | S | U | D | D | D | S | U | D | D |
| 3 | D | S | U | U | U | D | D | D | D | D |
| 4 | D | S | U | U | D | D | D | D | D | D |
| 5 | D | S | U | D | D | D | D | D | D | D |
| 6 | D | S | U | U | U | D | S | U | U | D |

METHOD AND DEVICE FOR SOUNDING SIGNAL ALLOCATION AND SOUNDING ASSISTED BEAMFORMING

CROSS-REFERENCE TO RELATED APPLICATION

This is a U.S. National Phase Application of International Application No. PCT/IB2012/000674, filed Mar. 1, 2012, which claims priority to Japanese Patent Application No. 2011-044282, filed on Mar. 1, 2011, entitled "BASE STATION AND COMMUNICATION SYSTEM", the disclosures of which are incorporated herein by reference in their entirety.

FIELD

Embodiments of the present disclosure relate generally to communication devices, and more particularly relate to a communication device comprising multiple antennas.

BACKGROUND

Some communication systems use an adoptive array antenna system for appropriately controlling directionality of an array antenna comprising a plurality of antennas. At surrounding base stations located around a base station, when signals are transmitted to a mobile phone using the adoptive array antenna system, null steering is performed with respect to a transmission directionality of an array antenna so as to direct nulls to the mobile phone in order to suppress interference with a mobile phone communicating with the base station. Because a number of nulls that can be set in null steering depends on a number of antennas in an array antenna, it may be impossible to direct nulls to the mobile phone to which they are required to be directed at surrounding base stations.

SUMMARY

A communication device and methods are disclosed. A transmission directionality of a plurality of antennas is controlled based on a received previously known signal transmitted from a communication terminal, when a signal to the communication terminal is transmitted. A first upstream radio sub-resource for transmitting the received previously known signal is allocated to a first communication terminal to which a downstream radio resource is to be allocated, and a first upstream radio resource for a first previously known signal comprises the first upstream radio sub-resource. A second upstream radio sub-resource for transmitting the received previously known signal is allocated to a second communication terminal to which a downstream radio resource is not to be allocated, a second upstream radio resource for a second previously known signal comprising the second upstream radio sub-resource.

In an embodiment, a communication device for use in a communication system comprises a communication module, and a radio resource allocation module. The communication module communicates with at least one communication terminal using the antennas, and controls a transmission directionality of the antennas based on a received previously known signal transmitted from a communication terminal, when transmitting a signal to the communication terminal. The radio resource allocation module allocates a first upstream radio sub-resource for transmitting the received previously known signal to a first communication terminal to which a downstream radio resource is to be allocated, a first upstream radio resource for a first previously known signal comprising the first upstream radio sub-resource. The radio resource allocation module further allocates a second upstream radio sub-resource for transmitting the received previously known signal to a second communication terminal to which a downstream radio resource is not to be allocated, a second upstream radio resource for a second previously known signal comprising the second upstream radio sub-resource.

In another embodiment, a method for operating a communication system, controls a transmission directionality of a plurality of antennas based on a received previously known signal transmitted from a communication terminal, when transmitting a signal to the communication terminal. The method further allocates a first upstream radio sub-resource for transmitting the received previously known signal to a first communication terminal to which a downstream radio resource is to be allocated, a first upstream radio resource for a first previously known signal comprising the first upstream radio sub-resource. The method then allocates a second upstream radio sub-resource for transmitting the received previously known signal to a second communication terminal to which a downstream radio resource is not to be allocated, a second upstream radio resource for a second previously known signal comprising the second upstream radio sub-resource.

In a further embodiment, a computer readable storage medium comprising computer-executable instructions for operating a communication system controls a transmission directionality of a plurality of antennas based on a received previously known signal transmitted from a communication terminal, when transmitting a signal to the communication terminal. The method executed by the computer-executable instructions further allocates a first upstream radio sub-resource for transmitting the received previously known signal to a first communication terminal to which a downstream radio resource is to be allocated, a first upstream radio resource for a first previously known signal comprising the first upstream radio sub-resource. The method executed by the computer-executable instructions further allocates a second upstream radio sub-resource for transmitting the received previously known signal to a second communication terminal to which a downstream radio resource is not to be allocated, a second upstream radio resource for a second previously known signal comprising the second upstream radio sub-resource.

BRIEF DESCRIPTION OF THE DRAWINGS

Embodiments of the present disclosure are hereinafter described in conjunction with the following figures, wherein like numerals denote like elements. The figures are provided for illustration and depict exemplary embodiments of the present disclosure. The figures are provided to facilitate understanding of the present disclosure without limiting the breadth, scope, scale, or applicability of the present disclosure.

FIG. 4 is a drawing showing types of TDD frame configurations according to an embodiment of the disclosure.

DETAILED DESCRIPTION

The following description is presented to enable a person of ordinary skill in the art to make and use the embodiments of the disclosure. The following detailed description is exemplary in nature and is not intended to limit the disclosure or the application and uses of the embodiments of the disclosure. Descriptions of specific devices, techniques, and applications are provided only as examples. Modifications to the examples described herein will be readily apparent to those of ordinary skill in the art, and the general principles defined herein may be applied to other examples and applications without departing from the spirit and scope of the disclosure. The present disclosure should be accorded scope consistent with the claims, and not limited to the examples described and shown herein.

Embodiments of the disclosure are described herein in the context of one practical non-limiting application, namely, a communication between a mobile communication device such as a mobile phone and a base station. Embodiments of the disclosure, however, are not limited to such base station-mobile communication, and the techniques described herein may be utilized in other applications. For example, embodiments may be applicable to relay stations, wireless modems, digital music players, personal digital assistance (PDA), e-books, personal handy phone system (PHS), lap top computers, TV's, GPS's or navigation systems, and other communication device.

As would be apparent to one of ordinary skill in the art after reading this description, these are merely examples and the embodiments of the disclosure are not limited to operating in accordance with these examples. Other embodiments may be utilized and structural changes may be made without departing from the scope of the exemplary embodiments of the present disclosure.

Figure 1:
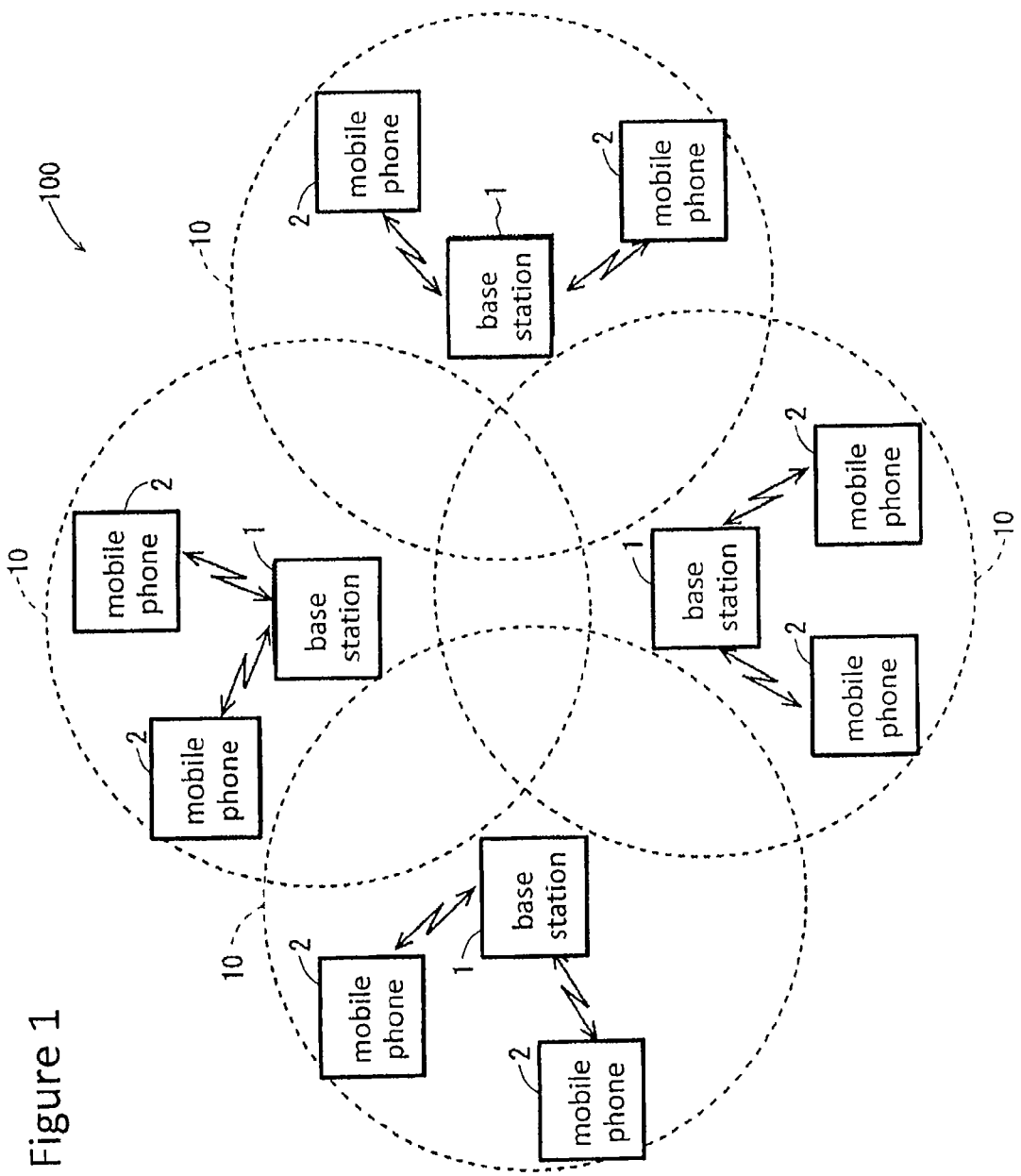
FIG. 1 is an illustration of a communication system according to an embodiment of the disclosure.

FIG. 1 is an illustration of communication system 100 (system 100) according to an embodiment of the disclosure. The communication system 100 may comprise a plurality of base stations 1. Each of the based stations 1 may utilize a wireless communication protocol and modulation scheme, such as but without limitation, LTE in which Time Division Duplexing (TDD) is adopted as a complex communication system, Third Generation Partnership Project Long Term Evolution (3GPP LTE)™, Third Generation Partnership Project 2 Ultra Mobile Broadband (3Gpp2 UMB)™, Time Division-Synchronous Code Division Multiple Access (TD-SCDMA)™, Wireless Interoperability for Microwave Access (WiMAX), or other communication protocol.

Each base station 1 communicates with a plurality of mobile phones 2. In the LTE, an Orthogonal Frequency Division Multiple Access (OFDMA) modulation is used for downstream communication and a Single Carrier-Frequency Division Multiple Access (SC-FDMA) modulation is used for upstream communication. Therefore, the OFDMA system is used for transmission from each of the base stations 1 to the mobile phone 2 (downstream communication), while the SC-FDMA system is used for transmission from the mobile phone 2 to each of the base stations 1 (upstream communication). In the OFDMA system, an Orthogonal Frequency Division Multiplexing (OFDM) signal is used in which a plurality of subcarriers orthogonal to each other are synthesized.

A service area 10 of each of the base stations 1 partially overlaps with other service area 10 of surrounding base stations 1. Because four base stations 1 are shown in FIG. 1, there are two or three surrounding base stations 1 for each of the base stations 1. However more surrounding base stations 1 may be present in the systems 100. For example but without limitations, six surrounding base stations 1 can be present for each of the base stations 1.

The base stations 1 are coupled to a network (not illustrated) and are able to communicate with each other via the network. A server device (not illustrated) is coupled to the network and each base station 1 is able to communicate with the server device via the network.

Figure 2:
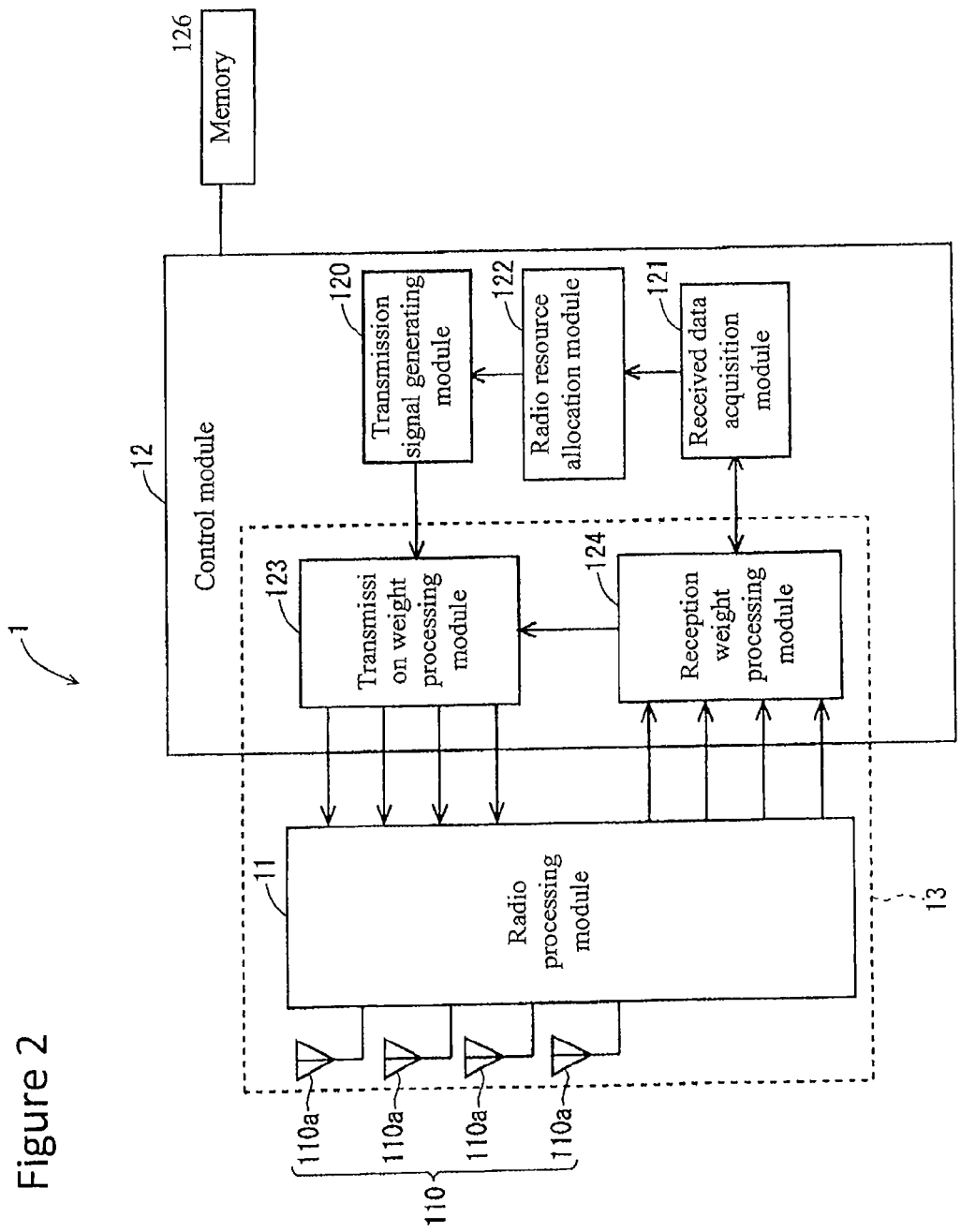
FIG. 2 is an illustration of a functional block diagram of a base station according to an embodiment of the disclosure.

FIG. 2 is an illustration of a functional block diagram of a base station 1 (system 200) according to an embodiment of the disclosure. The base station 1 is capable of simultaneously communicating with a plurality of mobile phones 2 by individually allocating to each of the mobile phones 2 (communication terminals 2), a radio source determined in two dimensions comprising a temporal axis and a frequency axis. The base station 1 comprises an array antenna as a transceiving antenna and is capable of controlling the directionality of the array antenna using an adoptive array antenna system.

The base station 1 comprises a radio processing module 11 and a control module 12 for controlling the radio processing module 11. The radio processing module 11 comprises an array antenna 110 comprising a plurality of antennas 110a. The radio processing module 11 conducts amplification processing, down-converting, analog-to-digital (A/D) conversion processing, or other signal processing related to each of a plurality of reception signals received at the array antenna 110. The radio processing module 11 also generates and outputs a plurality of base band reception signals.

The radio processing module 11 conducts digital-to-analog (D/A) conversion processing, up-converting, amplification processing, or other signal processing related to the base band transmission signals generated at the control module 12 to generate a plurality of transmission signals in a carrier band. The radio processing module 11 respectively inputs a plurality of transmission signals generated in the carrier band into the antennas 110*a*. Thereby, transmission signals are wirelessly transmitted from each of the antennas 110*a*.

The control module 12 is configured to support functions of the system 200. The control module 12 may control operations of the system 200 so that processes of the system 200 are suitably performed. Further, the control module 12 accesses the memory 126 such as access to communication data as described below. The control module 12, may be implemented or realized with a general purpose processor, a content addressable memory, a digital signal processor, an application specific integrated circuit, a field programmable gate array, a Central Processing Unit (CPU), any suitable programmable logic device, discrete gate or transistor logic, discrete hardware components, or any combination thereof, designed to perform the functions described herein.

In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

The control module 12 comprises a memory 126, a transmission signal generating module 120, a received data acquisition module 121, a radio resource allocation module 122, a transmission weight processing module 123, and a reception weight processing module 124.

The memory 126 may be any suitable data storage area with suitable amount of memory that is formatted to support the operation of the system 200. The memory 126 is configured to store, maintain, and provide data as needed to support the functionality of the system 200 in the manner described below. In practical embodiments, the memory 126 may comprise, for example but without limitation, a non-volatile storage device (non-volatile semiconductor memory, hard disk device, optical disk device, and the like), a random access storage device (for example, SRAM, DRAM), or any other form of storage medium known in the art. The memory 126 may be coupled to the control module 12 and configured to store communication data, such as but without limitation, an SRS transmittable band, SRS configuration, a radio resource configuration, time, or other data.

The transmission signal generating module 120 generates transmission data toward the mobile phone 2 which is a communication object. The transmission signal generating module 120 generates base band transmission signals containing the generated transmission data. The transmission signals may be generated for a number of antennas 110*a* comprising the array antenna 110.

The transmission weight processing module 123 respectively sets a plurality of transmission weights for controlling the transmission directionality at the array antenna 110 with respect to the plurality of transmission signals generated at the transmission signal generating module 120. After the transmission weight processing module 123 conducts an Inverse Discrete Fourier Transform (IDFT) on the transmission signals for which the transmission weights have been set, the transmission signals are output to the radio processing module 11.

After the reception weight processing module 124 conducts a Discrete Fourier Transform (DFT) on the reception signals input from the radio processing module 11, the reception weights are set respectively for controlling the reception directionality at the array antenna 110. The reception weight processing module 124 synthesizes the reception signals for which the reception weights have been respectively set and generates new reception signals.

The received data acquisition module 121 conducts DFT, demodulation processing, or other signal processing with respect to the new reception signals generated at the reception weight processing module 124 to acquire control data, user data, or other information comprised in the reception signals.

The communication module 13 is configured by the radio processing module 11, transmission weight processing module 123, and reception weight processing module 124 for communicating with the mobile phones 2 while appropriately controlling the directionality of the array antenna 110. The communication module 13 respectively controls the reception directionality and the transmission directionality of the array antenna 110 when communicating with each of the mobile phones 2. Specifically, the communication module 13 is capable of setting a beam and a null of the reception directionality at the array antenna 110 in various directions at the reception weight processing module 124 by adjusting the reception weight to be multiplied by a reception signal.

The communication module 13 is capable of setting a beam and a null of the transmission directionality at the array antenna 110 in various directions at the transmission weight processing module 123 by adjusting the transmission weight to be multiplied by a transmission signal. The transmission weight may be obtained from the reception weight and the reception weight is obtained based on a previously known signal from the mobile phone 2. The communication module 13 may also comprise configurations other than the radio processing module 11, transmission weight processing module 123, and reception weight processing module 124.

The radio resource allocation module 122 allocates, with respect to each of the mobile phones 2 as a communication object, a downstream radio resource (transmission frequency and transmission time frame) to be used for the transmission form the base station 1 to the mobile phone 2. Based on the downstream radio resource allocated to the mobile phone 2, the transmission signal generating module 120 generates a transmission signal to be transmitted to the mobile phone 2 and inputs the transmission signal into the transmission weight processing module 123 at a timing based on the downstream radio resource. Whereby, the transmission signal to be transmitted to the mobile phone 2 is transmitted from the communication module 13 using the downstream radio resource allocated to the mobile phone 2.

The transmission signal generating module 120 generates and outputs a transmission signal for informing the mobile phone 2 regarding the downstream radio resource allocated to the mobile phone 2. Thereby, the mobile phone 2 may be notified regarding the downstream radio resource to be used in a signal transmission to the device itself, allowing the mobile phone 2 appropriately receiving a signal from the base station.

The radio resource allocation module 122 allocates, with respect to each of the mobile phones 2 as a communication object, an upstream radio resource to be used by the mobile phone 2 in transmission to the base station 1. The transmission signal generating module 120 generates and outputs a transmission signal for informing the mobile phone 2 regarding the upstream radio resource allocated to the mobile phone 2 by the radio resource allocation module 122. Thereby, the mobile phone 2 may be notified regarding the upstream radio resource to be used in transmission to the base station 1, and transmits a signal to the base station 1 using the upstream radio resource.

<TDD Frame Configuration>

Next, a TDD frame 300 used between the base station 1 and the mobile phone 2 is described. The TDD frame 300 is determined in two dimensions comprising a temporal axis and a frequency axis. The frequency bandwidth (system bandwidth) of the TDD frame 300 is, for example but without limitation, 10 MHz and a time length of the TDD frame 300 is 10 ms. The base station 1 determines, from the TDD frame 300, an upstream radio resource and a downstream radio resource to be allocated to each of the mobile phones 2.

Figure 3:
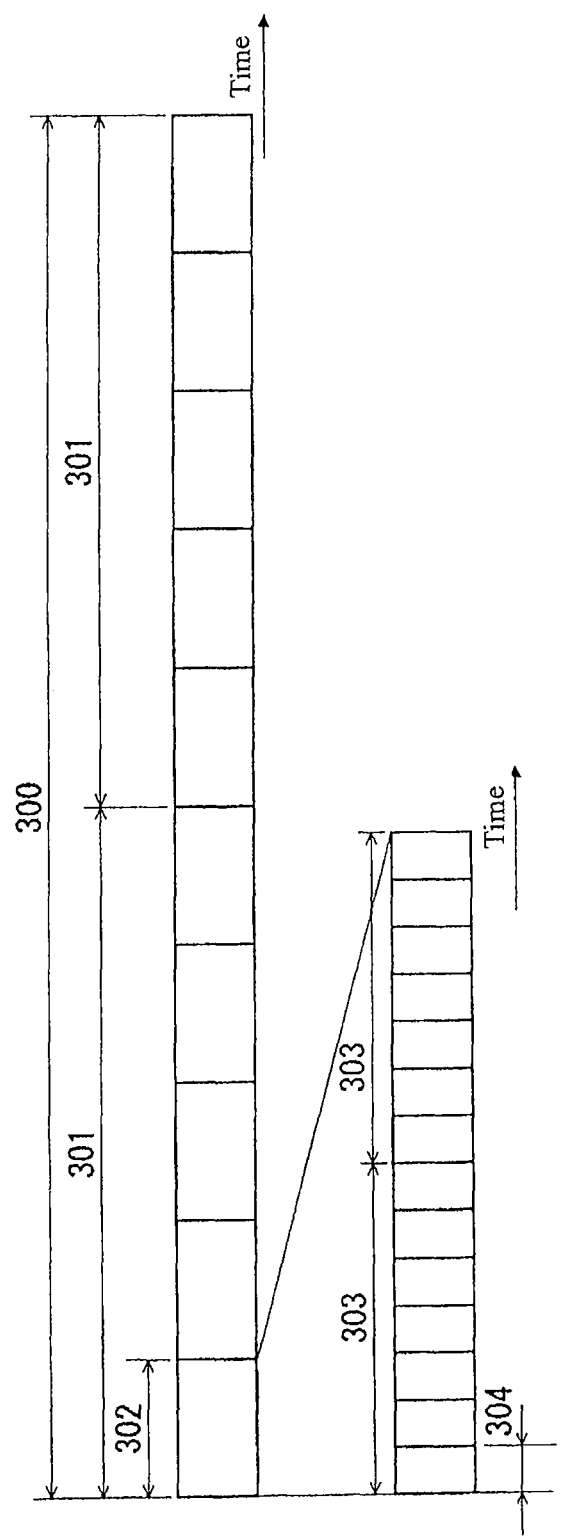
FIG. 3 is a drawing showing a configuration of a TDD frame according to an embodiment of the disclosure.

FIG. 3 is a drawing showing the configuration of the TDD frame 300 according to an embodiment of the disclosure. The TDD frame 300 comprises two half-frames 301. Each half-frame 301 comprises five sub-frames 302. That is, the TDD frame 300 comprises ten sub-frames 302. The time length of the sub-frame 302 is 1 ms. Hereinafter, the ten sub-frames 302 comprising the TDD frame 300 are sometimes referred to as the 0 to 9th sub-frames 302, sequentially starting from the first.

Each sub-frame 302 comprises two slots 303 in the temporal direction. Each slot 303 comprises seven symbol periods 304. Each sub-frame 302 comprises fourteen symbol periods 304 in the temporal direction. The symbol period 304 becomes one symbol period of an OFDM symbol in the downstream communication of the OFDMA system, and becomes one symbol period of a Discrete Fourier Transform Spread (DFTS) OFDM symbol in the upstream communication of the SC-FDMS system.

The TDD frame 300 configured as described thus far comprises a sub-frame 302 exclusively for upstream communication and a sub-frame 302 exclusively for downstream communication. Hereinafter, the sub-frame 302 exclusively for upstream communication is referred to as an "upstream sub-frame 302" and the sub-frame 302 exclusively for downstream communication is referred to as a "downstream sub-frame 302."

With LTE, in a TDD frame 300, a region (radio resource) including seven symbol periods 304 (one slot 303) in the temporal direction and including a frequency bandwidth of 180 kHz in the frequency direction is referred to as a "resource block (RB)." A resource block comprises twelve subcarriers. The radio resource allocation module 122 allocates an upstream radio resource as well as a downstream radio resource to each of the mobile phone 2 in units of one resource blocks. Because the SC-FDMA system is used in upstream communication, in one slot 303 of the upstream sub-frame 302, when a plurality of resource blocks are allocated to a mobile phone 2, a plurality of resource blocks consecutive in the frequency direction are allocated to the mobile phone 2.

With LTE, seven configuration types with different combinations of the upstream sub-frame 302 and the downstream sub-frame 302 are provided for the configuration of the TDD frame 300. FIG. 4 is a drawing showing the seven configuration types.

With LTE, TDD frame 300 configurations of No. 0 to No. 6 are provided. In communication system 100 of FIG. 1, one configuration is used among the seven configuration types. The sub-frame 302 indicated by "D" in FIG. 4 means a downstream sub-frame 302, whereas the sub-frame 302 indicated by "U" means an upstream sub-frame 302. The sub-frame 302 indicated by "S" means a sub-frame 302 for switching from downstream communication to upstream communication in the communication system 100. The sub-frame 302 is referred to as a "special sub-frame 302."

In the TDD frame 300 having a configuration of No. 0, 0 and the 5th sub-frame 302 are downstream sub-frames 302, the 2nd to 4th sub-frames 302 as well as the 7th to 9th sub-frames 302 are upstream sub-frames 302, and the first and 6th sub-frame 302 are special sub-frames 302. In the TDD frame 300 having a configuration of No. 4, 0 sub-frame 302 as well as the 4th to 9th sub-frames 302 are downstream sub-frames 302, the second and 3rd sub-frames 302 are upstream sub-frames 302, and the first sub-frame 302 is a special sub-frame 302.

Figure 5:
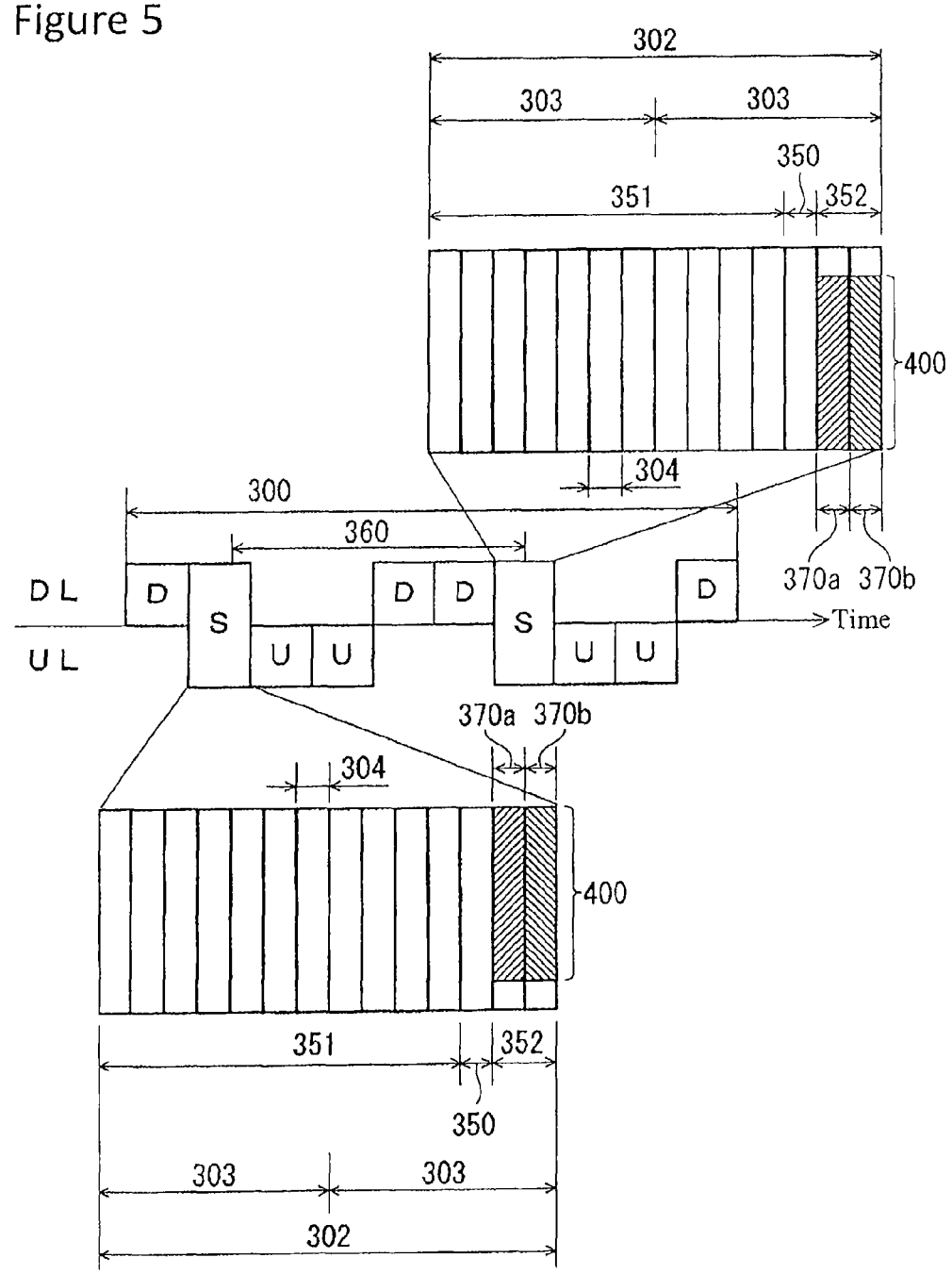
FIG. 5 is a drawing showing details of a TDD frame configuration having configuration of No. 1 according to an embodiment of the disclosure.

FIG. 5 is a drawing showing the details of a TDD frame 300 configuration having configuration of (No. 1). The special sub-frame 302 comprises a downstream pilot time slot (DwPTS) 351, a guard time (GP) 350, and an upstream pilot time slot (UpPTS) 352 in the temporal direction. The guard time 350 is a radio signal period required for switching from downstream communication to upstream communication, but is not used in communication. In the following explanations, the TDD frame 300 of configuration of No. 1 is used in the communication system 100.

With LTE, combinations of a plurality of types are provided with regard to the combination of the time length of the downstream pilot time slot 351, the guard time 350, and the upstream pilot time slot 352. The time length of the downstream pilot time slot 351 is set to be eleven symbol periods 304 and the time length of the upstream pilot time slot 352 is set to be two symbol periods 304.

In the communication system 100 according to an embodiment, downstream communication is possible not only in the downstream sub-frames 302 but also in the downstream pilot time slot 351 of the special sub-frames 302. In the present communication system 100, upstream communication is possible not only in the upstream sub-frames 302 but also in the upstream pilot time slot 352 of the special sub-frames 302

The base station 1 transmits user data or control data to the mobile phone 2 in each symbol period 304 of the downstream pilot time slot 351. The mobile phone 2 transmits a previously known signal called a "sounding reference signal (SRS)" in each symbol period 304 of the upstream pilot time slot 352. A plurality of complex symbols for modulating a plurality of subcarriers comprises an SRS. In an embodiment, an SRS transmitted in the upstream pilot time slot 352 is used to calculate the transmission weight. That is, the base station 1 controls the transmission directionality at the array antenna 110 based on the SRS transmitted by the mobile phone 2 in the upstream pilot time slot 352.

The SRS may be transmitted even in the last symbol period 304 of the upstream sub-frame 302. From hereinafter, if not specifically stated, SRS refers to an SRS to be transmitted using an upstream pilot time slot 352.

Because the SRS is transmitted in each upstream pilot time slot 352 of the special sub-frame 302, from the first of the upstream pilot time slots 352 of the special sub-frame 302 to the first of the upstream pilot time slots 352 of the following special sub-frame 302 is referred to as an "SRS transmission frequency 360."

A symbol period 304 ahead of the upstream pilot time slot 352 is referred to as an "anterior SRS transmission symbol period 370a" and a symbol period 304 after the upstream pilot time slot 352 is referred to as a "posterior SRS transmission symbol period 370b." If there is no need to particularly distinguish the anterior and the posterior SRS transmission symbol periods, each is referred to as "SRS transmission symbol periods 370." Each mobile phone 2 transmits an SRS at least either in the anterior SRS transmission symbol period 370a or in the posterior SRS transmission symbol period 370b in each special sub-frame 302 (in every SRS transmission cycle 360).

<Transmission Frequency Band of SRS>

With LTE, when the SRS is transmitted in one SRS transmission symbol period 370, the entire region of a system band cannot be used. Specifically, when the SRS is transmitted in one SRS transmission symbol period 370, either the end part on the low frequency side of the system band or the end part on the high frequency side thereof cannot be used. That is, in the system band, a frequency band that may be used for transmitting the SRS is either arranged closer to the high frequency side or arranged closer to the low frequency side. Hereinafter, the frequency band that may be used for transmitting the SRS is referred to as the "SRS transmittable band 400." In FIG. 5, the SRS transmittable band 400 is shown by the shaded portion. When a system bandwidth is 10 MHz, the SRS transmittable band 400 becomes a frequency band equivalent of forty resource blocks (180 kHz×40).

In the communication system 100, a special sub-frame 302 for which the SRS transmittable band 400 is arranged closer to the high frequency side of the system band in each of the anterior SRS transmission symbol period 370a and the posterior SRS transmission symbol period 370b and a special sub-frame 302 for which the SRS transmittable band 400 is arranged closer to the low frequency side of the system band in each of the anterior SRS transmission symbol period 370a and the posterior SRS transmission symbol period 370b, appear alternately. That is, the SRS transmittable band 400 is alternately arranged on the high frequency side and the low frequency side of the system band for every SRS transmission cycle 360.

In the communication system 100, the frequency band used by one mobile phone 2 for transmitting the SRS (hereinafter, referred to as a "SRS transmission band") changes in each special sub-frame 302 in the SRS transmittable band 400 (in every SRS transmission cycle), and one mobile phone 2 transmits the SRS a plurality of times to transmit the SRS over the entire region of the SRS transmittable band 400. This operation is called "frequency hopping."

Figure 6:
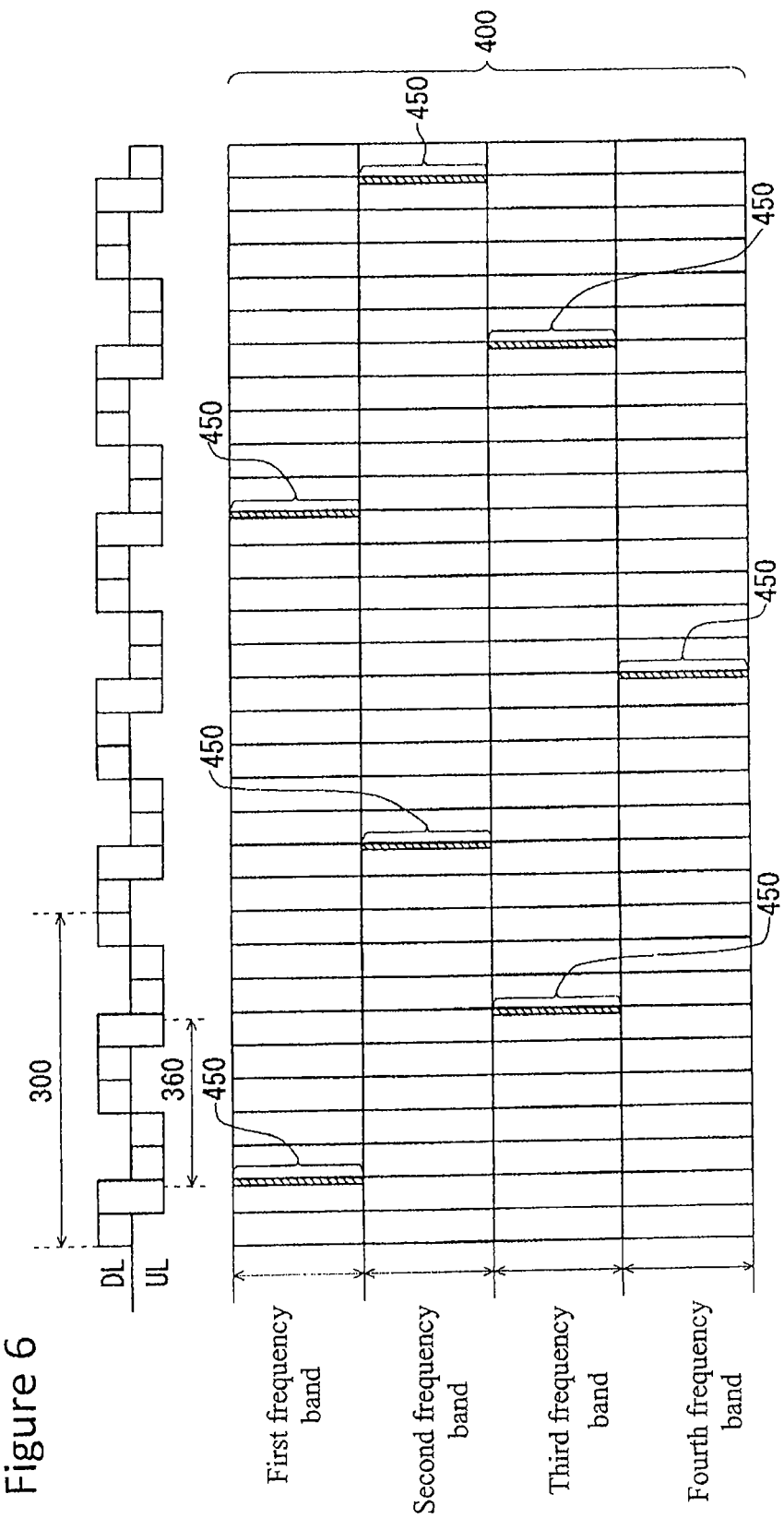
FIG. 6 is a drawing showing how an SRS transmission band is subjected to frequency hopping.

FIG. 6 is a drawing showing one example of how an SRS transmission band 450 used by a mobile phone 2 is subjected to frequency hopping. The SRS transmittable band 400 is divided into first to fourth frequency bands. An SRS transmission band 450 having a bandwidth of 1/4 the bandwidth of the SRS transmittable band 400 changes in the order of the first frequency band, the third frequency band, the second frequency band, and the fourth frequency band every SRS frequency cycle 360. The SRS transmission 450 in the anterior SRS transmission symbol period 370a and the SRS transmission band 450 in the posterior SRS transmission symbol period 370b are subject to frequency hopping while being independent from each other.

<SRS Configuration>

In the communication system 100, two kinds of SRS that can be distinguished by a parameter kTC, referred to as a "transmission Comb," have been provided. Each mobile phone 2 transmits one of these two kinds of SRS either in the anterior SRS transmission symbol period 370a or in the posterior SRS transmission symbol period 370b.

The parameter kTC may take a figure of either "0" or "1." A plurality of subcarriers SC0 used for transmitting an SRS (hereinafter, referred to as "SRS0") specified by a parameter kTC=0 are not consecutively arranged in the frequency direction but arranged in a pectinate form. In other words, the carrier frequency of the SRS0 is arranged in a pectinate form in the frequency direction. Likewise, a plurality of subcarriers SC1 used for transmitting an SRS (hereinafter, referred to as "SRS1") specified by a parameter kTC=1 are consecutively arranged in the frequency direction. In case of transmitting the SRS0 and the SRS1 in the same frequency band, the plurality of subcarriers SC0 used for transmitting the SRS0 and the plurality of subcarriers used for transmitting the SRS1 are alternately arranged in the frequency direction. Consequently, the carrier frequency of the SRS0 and the carrier frequency of the SRS1 do not mutually overlap in the frequency direction.

Figure 7:
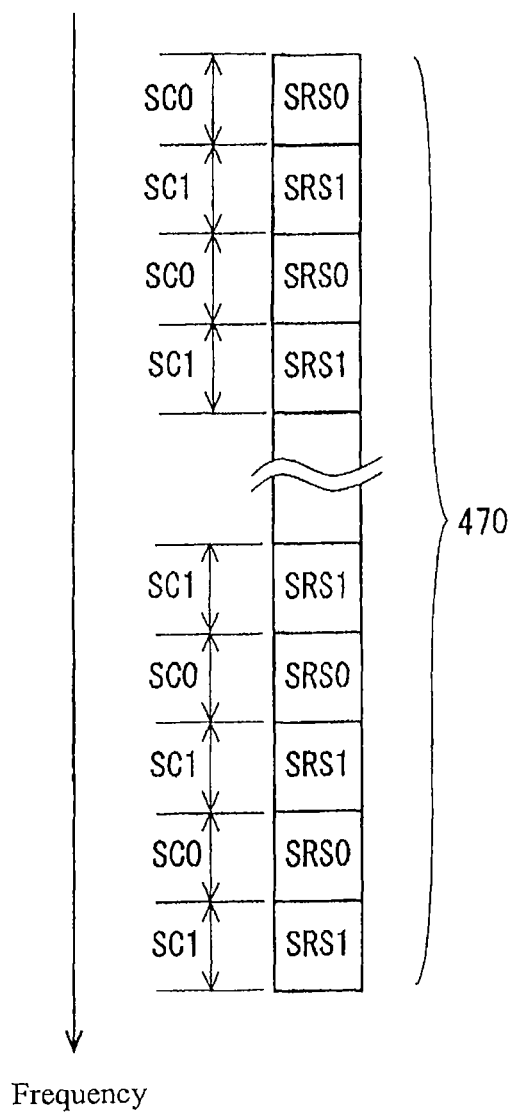
FIG. 7 is a drawing showing a configuration of an SRS.

FIG. 7 shows how both SRS0 and SRS1 are transmitted in a frequency band 470 that is comprised in the SRS transmittable band 400. As shown in FIG. 7, the plurality of subcarriers SC0 used for the transmission of SRS0 are arranged as every second subcarrier in the frequency direction. Likewise, the plurality of subcarriers SC1 used for the transmission of SRS1 are arranged as every second subcarrier in the frequency direction. The plurality of subcarriers SC0 and the plurality of subcarriers SC1 comprised in the same frequency band 470 are arranged alternately in the frequency direction.

As described above, because the plurality of subcarriers used by one mobile phone 2 for transmitting an SRS are arranged in a pectinate form in the frequency direction, not all the subcarriers in the SRS transmission band used by the mobile phone 2 are used for transmitting the SRS. Because the plurality of subcarriers SC0 and the plurality of subcarriers SC1 comprised in the same frequency band are arranged alternately, the mobile phone 2 transmitting the SRS0 and a mobile phone 2 transmitting the SRS1 may use the same SRS transmission band in the same SRS transmission symbol period 370. From a point on the base station 1 side, the base station 1 is able to distinguish SRS0 from SRS1 transmitted in the same SRS transmission band in the same SRS transmission symbol period 370.

In the communication system 100, eight kinds of symbol patterns comprising a plurality of complex symbols comprising an SRS are provided. For the eight kinds of symbol patterns, eight kinds of mutually orthogonal symbol series are respectively adopted. The mobile phone 2 transmits one of eight kinds of symbol patterns as SRS.

As described, because eight kinds of mutually orthogonal symbol patterns in which eight kinds of symbol series have been adopted, are provided for SRS, a maximum of eight mobile phones 2 may transmit an SRS0 using the same SRS transmission band in the same SRS transmission symbol period 370. A maximum of eight mobile phones 2 can transmit an SRS1 using the same SRS transmission band in the same SRS transmission symbol period 370.

Hereinafter, SRS0 transmitted in the anterior SRS transmission symbol period 370a and the posterior SRS transmission symbol period 370b are respectively referred to as the "anterior SRS0" and "posterior SRS0." SRS1 transmitted in the anterior SRS transmission symbol period 370a and the posterior SRS transmission symbol period 370b are respectively referred to as the "anterior SRS1" and "posterior SRS1".

An upstream radio resource specified by the anterior SRS transmission symbol period 370a as well as the plurality of subcarriers SC0 in a pectinate form that are comprised in the SRS transmittable band 400 and may be used for transmitting the SRS0, is referred to as an "upstream radio resource for anterior SRS0 500a," while an upstream radio resource specified by the anterior SRS transmission symbol period 370a as well as the plurality of subcarriers SC1 in a pectinate form that is comprised in the SRS transmittable band 400 and may be used for transmitting the SRS1, is referred to as an "upstream radio resource for anterior SRS1 500b."

An upstream radio resource specified by the posterior SRS transmission symbol period 370b as well as the plurality of subcarriers SC0 in a pectinate form which is an upstream radio resource comprised in the SRS transmittable band 400 and may be used for transmitting an SRS0, is referred to as an "upstream radio resource for posterior SRS0 500c," while an upstream radio resource specified by the posterior SRS transmission symbol period 370b as well as the plurality of subcarriers SC1 in a pectinate form which is an upstream radio resource comprised in the SRS transmittable band 400 and may be used for transmitting an SRS1, is referred to as an "upstream radio resource for posterior SRS1 500d."

Figure 8:
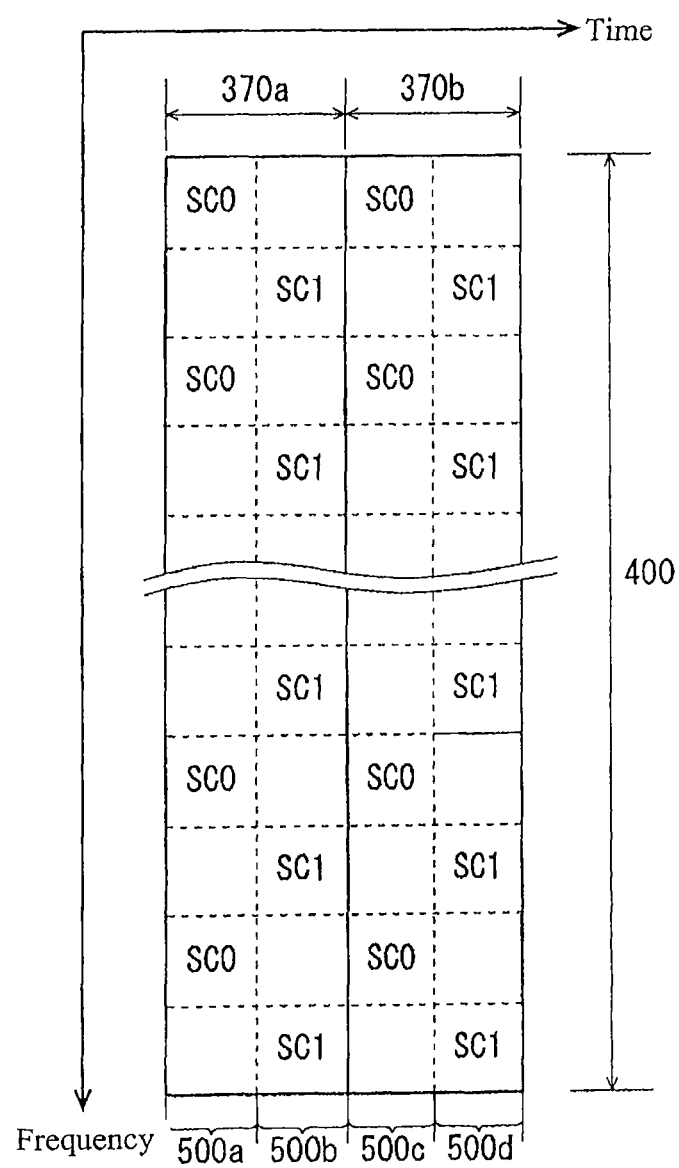
FIG. 8 is a drawing showing an upstream radio resource capable of transmitting an SRS.

FIG. 8 is a drawing showing an upstream radio resource for the anterior SRS0 500a, an upstream radio resource for the anterior SRS1 500b, an upstream radio resource for the posterior SRS0 500c, and an upstream radio resource for the posterior SRS1 500d. The upstream radio resource for the anterior SRS0 500a, the upstream radio resource for the anterior SRS1 500b, the upstream radio resource for the posterior SRS0 500c, and the upstream radio resource for the posterior SRS1 500d are different from each other in at least either the temporal direction or the frequency direction. Hereinafter, when it is not required to distinguish these upstream radio resources, each of them is referred to as an "upstream radio resource for SRS." The temporal direction may comprise the time axis.

In an embodiment, with respect to each mobile phone 2 communicating with the base station 1, the radio resource allocation module 122 allocates, for SRS transmission, one among the upstream radio resource comprised in the upstream radio resource for anterior SRS0 500a, the upstream radio resource comprised in the upstream radio resource for anterior SRS1 500b, the upstream radio resource comprised in the upstream radio resource for posterior SRS0 500c, and the upstream radio resource comprised in the upstream radio resource for posterior SRS1 500d. Specifically, with respect to each mobile phone 2 communicating with the base station 1, the radio resource allocation module 122 allocates the bandwidth of an SRS transmission band (hereinafter, referred to as an "SRS transmission bandwidth"), the SRS transmission symbol period 370, the frequency hopping method of the SRS transmission band, the value of the parameter kTC, and the kind of SRS symbol pattern to allocate the upstream radio resource for SRS transmission to each mobile phone 2.

Herein, with LTE, a plurality of bandwidths mutually different in size are determined as bandwidths that can be set as the SRS transmission bandwidth. For example, when the system bandwidth is 10 MHz, three kinds of bandwidths, i.e. a bandwidth equivalent to forty resource blocks (180 kHz× 40), a bandwidth equivalent to 20 resource blocks (180 kHz×20), and a bandwidth equivalent to four resource blocks (180 kHz×4) are prescribed. The radio resource allocation module 122 allocates one of the bandwidths to the mobile phone 2 as the SRS transmission bandwidth. Hereinafter, the bandwidth equivalent to x number of resource blocks is referred to as "xRB."

The transmission signal generating module 120 generates transmission signals including a control signal (hereinafter, referred to as a "SRS control signal") to inform the mobile phone 2 regarding the upstream radio resource for SRS transmission allocated to the mobile phone 2 in the radio resource allocation module 122. The transmission signals are transmitted from the communication module 13 to the mobile phone 2. Thereby, SRS control signals are transmitted to each mobile phone 2, making it possible for each mobile phone 2 to recognize the upstream radio resource for SRS transmissions allocated to the mobile phone itself. That is, each mobile phone 2 is able to recognize the SRS transmission bandwidth, the SRS transmission symbol period 305, the kind of SRS symbol pattern, the frequency hopping method of the SRS transmission, and the value of a parameter kTC allocated to itself. Each mobile phone 2 transmits an SRS in every SRS transmission cycle 360 using the upstream radio resource allocated to itself. An SRS control signal is referred to as "RRC Connection Reconfiguration message" in LTE.

<Communication System Operation in the Event of Controlling the Transmission of SRS>

Next, operations of the communication system 100 are described from the time when the mobile phone 2 receives a new SRS control signal to the time when the mobile phone 2 transmits an SRS based on the new SRS control signal. Hereinafter, the mobile phone 2 that is an object in the description is sometimes referred to as an "object mobile phone 2."

Figure 9:
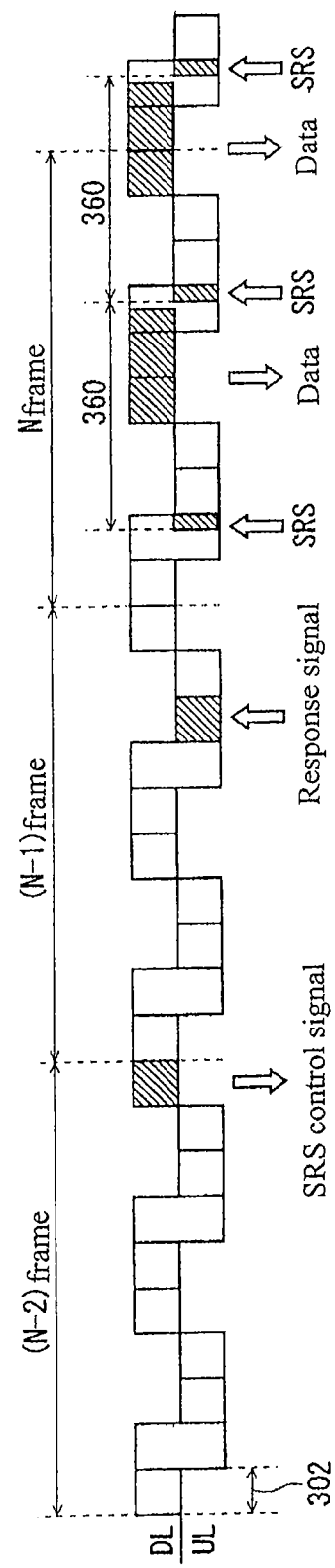
FIG. 9 is a drawing showing an operation of a communication system according to an embodiment of the disclosure.

FIG. 9 is a drawing showing the operation of a communication system pertaining to the embodiment. For example, in a downstream sub-frame 302 located at the end of the (N−2)th TDD frame 300, when a new SRS control signal is transmitted from the base station 1 to the object mobile phone 2, in the upstream sub-frame 302 which is the eighth from the first one of the next (N−1)th TDD frame 300, the object mobile phone 2 transmits, to the base station 1, a response signal for informing that the new SRS control signals have been properly received. The response signal is referred to as a "RRC Connection Reconfiguration Complete message." Thereby, a new upstream radio resource for SRS transmission is set in the object mobile phone 2.

The object mobile phone 2 transmitting the response signal transmits an SRS in every SRS transmission cycle 360 using the upstream radio resource notified by the new SRS control signal received at the N−2)th TDD frame 300. The object mobile phone 2 transmits an SRS using the upstream radio resource notified by the previously received SRS control signal until an SRS is transmitted using the upstream radio resource notified by the new SRS control signal.

As described, in a TDD frame 300, when the base station 1 transmits a new SRS control signal to the object mobile phone 2, in and onward from a TDD frame 300 two after the aforementioned TDD frame 300, the objective mobile phone 2 transmits an SRS based on the new SRS control signal.

At the base station 1, when an SRS is received from an object mobile phone 2 in an SRS transmission cycle 360, the transmission directionality of the array antenna 110 is controlled at the time when data to the objective mobile phone 2 is transmitted based on the received SRS in the SRS transmission cycle. That is, in an SRS transmission cycle 360, the transmission directionality at the time when data is transmitted to the object mobile phone 2 is controlled, based on the SRS received from the object mobile phone 2 in the SRS transmission cycle 360.

At the base station 1, when the SRS from the object mobile phone 2 is received at the communication module 13, the reception weight processing module 124 calculates the reception weight based on the SRS. The transmission weight processing module 123 calculates the transmission weight to be applied to the transmission signal directed to the object mobile phone 2, based on the reception weight calculated in the reception weight processing module 124. The transmission weight processing module 123 sets the calculated transmission weight with respect to a plurality of transmission signals including data to the object mobile phone 2 generated in the transmission signal generating module 120 and inputs, in the radio processing module 11, the plurality of transmission signals for which the transmission weight has been set. Thereby, a beam related to the transmission directionality in the frequency band of the transmission signals to the object mobile phone 2 in the array antenna 110 is directed to the object mobile phone 2 so that the data is transmitted appropriately to the object mobile phone 2.

The radio resource allocation module 122 estimates the state of the upstream transmission path based on the SRS from each mobile phone 2 with which the base station 1 is communicating. The radio resource allocation module 122 allocates an upstream radio resource in an upstream sub-frame 302 to each mobile phone 2 based on the estimated results and the like of the state of the transmission path.

<Mapping of an Upstream Radio Resource and a Downstream Radio Resource for SRS>

Figure 10:
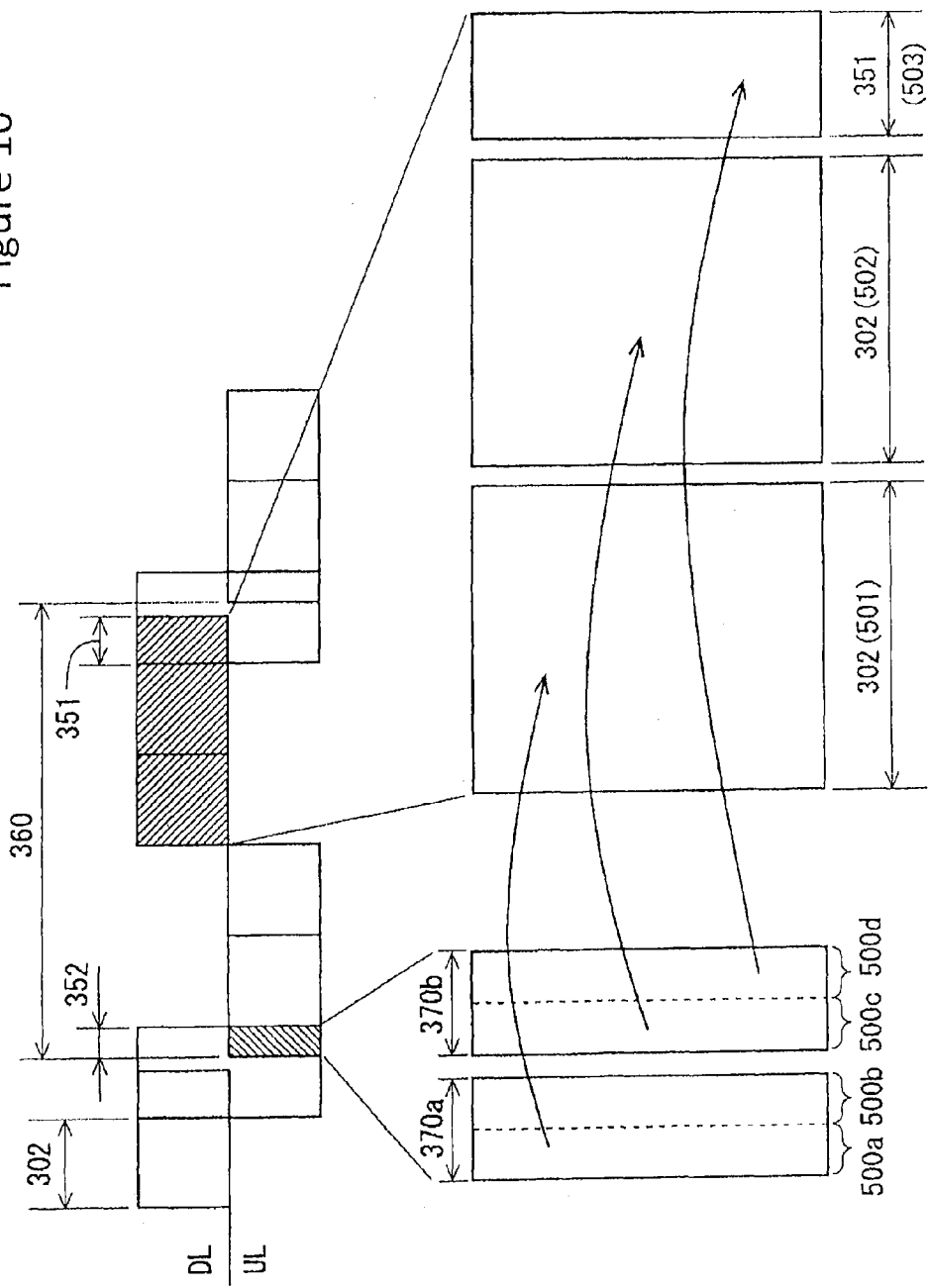
FIG. 10 is a drawing showing a mapping of an upstream radio resource and a downstream sub-frame for an SRS transmission.

In the communication system 100, in each SRS transmission cycle 360, the upstream radio resource for anterior SRS0 500a and a first subsequent downstream sub-frame 302 are mapped. The upstream radio resource for posterior SRS0 500c and the second subsequent downstream sub-frame 302 are mapped. The upstream radio resource for posterior SRS1 500d and a portion including a downstream pilot time slot 351 in the temporal direction in a subsequent special sub-frame 302 are mapped. FIG. 10 shows the situation. FIG. 10 is a drawing showing the mapping of an upstream radio resource and a downstream sub-frame for SRS transmission. FIG. 10 shows an SRS transmission cycle 360 including an upstream pilot time slot 352 of the first special sub-frame 302 of a TDD frame 300; however, the same applies to an SRS transmission cycle 360 including an upstream pilot time slot 352 of a second special sub-frame 302 of the TDD frame 300.

Hereinafter, a downstream sub-frame 302 mapped to the upstream radio resource for anterior SRS0 500a is sometimes referred to as a "first downstream sub-frame 501." A downstream sub-frame 302 mapped to the upstream radio resource for posterior SRS0 500c is sometimes referred to as a "second downstream sub-frame 502." The portion including the downstream pilot time slot 351 in the temporal direction in the special sub-frame 302 mapped to the upstream radio resource for posterior SRS1 500d is not equivalent to the downstream sub-frame 302 comprised in a TDD frame 300, but is sometimes referred to as a "third downstream sub-frame 503" for convenience. Hereinafter, a downstream sub-frame is meant to be inclusive of the "third downstream sub-frame 503."

In the communication module 13 at the base station 1, in a downstream sub-frame, when a transmission signal including various data is transmitted to the object mobile phone 2, the transmission weight applied to the transmission signal is calculated, based on an SRS transmitted from the object mobile phone 2 in an upstream radio resource for SRS mapped to the downstream sub-frame. Specifically, the reception weight is calculated based on the SRS and the transmission weight is calculated based on the reception weight. That is, at the base station 1, when a transmission signal is transmitted to the object mobile phone 2 using a downstream sub-frame, the object mobile phone 2 controls the transmission directionality of the array antenna 110, based on the SRS to be transmitted using an upstream radio resource comprised in an upstream radio resource for an SRS that has been mapped to the downstream sub-frame so that the beam of the transmission directionality is directed to the object mobile phone 2 in a frequency band of the transmission signal.

With respect to each mobile phone 2 with which the base station 1 is communicating, for each of a prescribed number of TDD frames 300, the radio resource allocation module 122 determines the allocation priority of a downstream radio resource (hereinafter, sometimes referred to as "downstream allocation priority") based on proportional fairness (PF) and the like. When the downstream allocation priority is determined with respect to each mobile phone 2 with which the base station 1 is communicating, the radio resource allocation module 122 regards a mobile phone 2 with a downstream allocation priority higher than a reference value as a mobile phone 2 to which a downstream radio resource is to be allocated (hereinafter, sometimes referred to as a "terminal 2 with a downstream allocation") and a mobile phone 2 with a downstream allocation priority lower than a reference value as a mobile phone 2 to which a downstream radio resource is not to be allocated (hereinafter, sometimes referred to as a "terminal 2 without a downstream allocation"). In the event of absence of transmission data with respect to the mobile phone 2, the allocation priority of the mobile phone 2 becomes low. Whereas, when data such as control data and the like is needed to be transmitted urgently to the mobile phone 2, the downstream allocation priority of the mobile phone 2 becomes higher.

Thereafter, the radio resource allocation module 122 allocates a downstream radio resource to each mobile phone which is an object of the downstream radio resource allocation, based on the downstream allocation priority, transmission data volume, and the like. Then, in order to have the frequency band of a transmission signal to be transmitted to the mobile phone 2 in a downstream sub-frame comprised in the transmission frequency band of an SRS to be transmitted by an upstream radio resource for SRS mapped to the aforementioned downstream sub-frame, the radio resource allocation module 122 allocates a downstream radio resource to the mobile phone 2.

In the communication module 13 at the base station 1, among SRSs transmitted from an object mobile phone 2 in the upstream radio resource for SRS, the transmission weight is calculated using a portion of a frequency band which is the same as the frequency band of a transmission signal to be transmitted to the object mobile phone 2 in a downstream sub-frame mapped to the aforementioned upstream radio resource for SRS. That is, at the base station 1, among a plurality of complex symbols comprising the SRS transmitted by the object mobile phone 2 in the upstream radio resource for SRS, a plurality of complex symbols transmitted using a frequency band that is the same as the frequency band as the transmission signal to be transmitted to the object mobile phone 2 in a downstream sub-frame mapped to the aforementioned upstream radio resource for SRS, are used to calculate the transmission weight. As described, an accurate transmission weight may be calculated by mapping the frequency band of the transmission signal and the frequency band of an SRS to be used in the event of obtaining the transmission weight applied to the aforementioned transmission signal.

Because a downstream sub-frame is not mapped to the upstream radio resource for the anterior SRS1 500*b*, principally, a signal is not transmitted using a downstream sub-frame to the mobile phone 2 to which an SRS (anterior SRS1) is transmitted using an upstream radio resource comprised in the upstream radio resource for the anterior SRS1 500*b*. However, as described later, as an exception, a signal is sometimes transmitted using any one of the first downstream sub-frame 501 through the third downstream sub-frame 503 to the mobile phone to which the SRS (anterior SRS1) is transmitted using the upstream radio resource comprised in the upstream radio resource for the anterior SRS1 500*b*.

Figure 11:
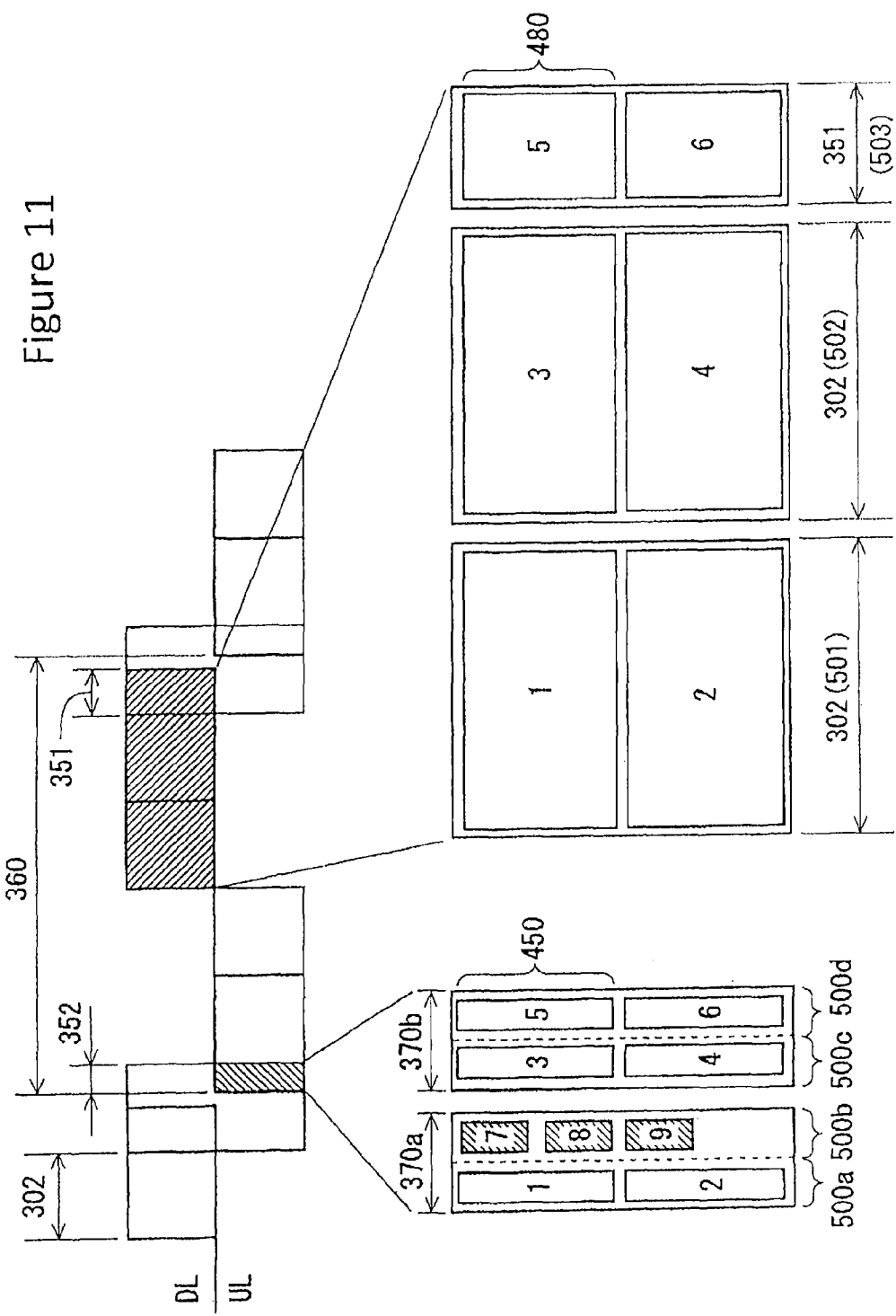
FIG. 11 is a drawing showing an allocation example of a downstream radio resource to a mobile phone.

FIG. 11 is a drawing showing an allocation example of a downstream radio resource to the mobile phone 2. In the example in FIG. 11, mobile phones 2 with terminal numbers 1 and 2 transmit an SRS (anterior SRS0) using an upstream radio resource comprised in the upstream radio resource for anterior SRS0 500*a*, the mobile phones 2 with terminal numbers 3 and 4 transmit an SRS (posterior SRS0) using an upstream radio resource comprised in the upstream radio resource for the posterior SRS1 500*c*, and mobile phones 2 with terminal numbers 5 and 6 transmit an SRS (posterior SRS1) using an upstream radio resource comprised in the upstream radio resource for the posterior SRS1 500*d*. The mobile phones 2 with terminal numbers 7 to 9 transmit an SRS (anterior SRS1) using an upstream radio resource comprised in the upstream radio resource for the anterior SRS1 500*b*. In the example in FIG. 11, with regard to each of the mobile phones with terminal numbers 1 to 6, the frequency band 480 of a transmission signal transmitted to the mobile phone 2 matches the SRS transmission band 450 with respect to the aforementioned mobile phones 2.

<A Method of Allocating an Upstream Radio Resource to a Mobile Phone for SRS Transmission>

In the embodiment, with respect to the mobile phone 2 to which a downstream radio resource is to be allocated, for SRS transmission, the radio resource allocation module 122 allocates one among an upstream radio resource comprised in the upstream radio resource for anterior SRS0 500*a*, an upstream radio resource comprised in the upstream radio resource for posterior SRS0 500*c*, and an upstream radio resource comprised in the upstream radio resource for posterior SRS1 500*d*. That is, as an SRS to be transmitted, one among the anterior SRS0, the posterior SRS0 and the posterior SRS1 is allocated to the mobile phone 2 to which a downstream radio resource is to be allocated as an SRS to be transmitted.

With respect to a mobile phone 2 to which a downstream radio resource is not allocated, the radio resource allocation module 122 allocates an upstream radio resource comprised in the upstream radio resource for the anterior SRS1 500*b* as an SRS to be transmitted. In other words, to a mobile phone 2 to which a downstream radio resource is not allocated, an anterior SRS1 is allocated as an SRS to be transmitted. Hereinafter, an SRS transmitted by a mobile phone 2 to which a downstream radio resource is allocated is sometimes referred to as an "SRS with an allocation" (anterior SRS0, posterior SRS0 and posterior SRS1 in the present embodiment). Whereas, an SRS transmitted by a mobile phone 2 to which a downstream radio resource is not allocated is sometimes referred to as an "SRS without an allocation" (anterior SRS1 in the present embodiment).

With respect to a mobile phone 2 to which an SRS with an allocation is transmitted, when a signal is transmitted using the downstream radio resource allocated to the mobile phone 2, the communication module 13 performs null steering and beam forming with regard to the transmission directionality of the array antenna 110.

As shown in FIG. 8, an upstream radio resource (an upstream radio resource comprising the upstream radio resource for the anterior SRS0 500*a*, the upstream radio resource for the posterior SRS0 500*c*, and the upstream radio resource for the posterior SRS1 500*d*) that may be used for transmitting an SRS with an allocation is different in the temporal direction from an upstream radio resource (the upstream radio resource for the anterior SRS1 500*b*) that may be used for transmitting an SRS without an allocation. In other words, an upstream radio resource that may be used for transmitting an SRS with an allocation is not superimposed in the temporal direction with an upstream radio resource that may be used for transmitting an SRS without an allocation.

As described above, differentiating, in at least either the temporal direction or the frequency direction (in the temporal direction in the present embodiment), an upstream radio resource that may be used for the SRS transmission transmitted by a mobile phone 2 to which a downstream radio resource is allocated (hereinafter, referred to as a "first upstream radio resource for SRS") from an upstream radio resource that may be used for the SRS transmission transmitted by a mobile phone 2 to which a downstream radio resource is not to be allocated (hereinafter, sometimes referred to as a "second upstream radio resource for SRS") increases the probability of directing a null to a mobile phone 2 to which the null is required to be directed at the base station 1 and the surrounding base stations 1 respectively at which null steering is conducted with regard to the transmission directionality of the array antenna 110. Hereinafter, this is described in detail.

Figure 12:
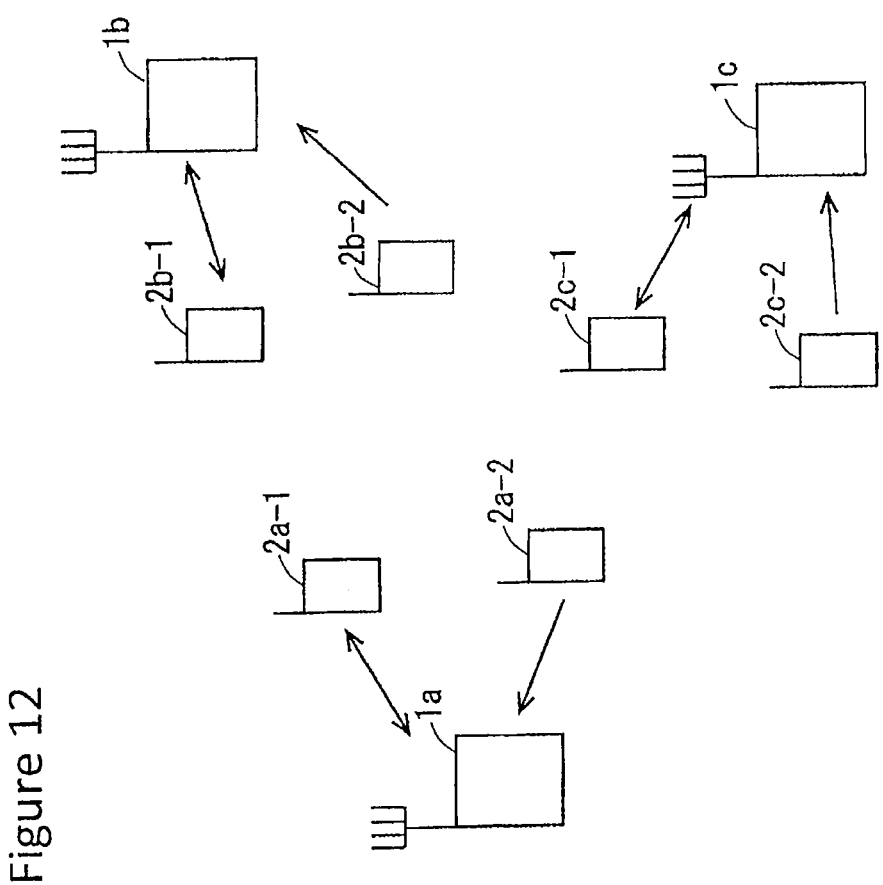
FIG. 12 is a drawing showing one example of how a base station and surrounding base stations communicate with a mobile phone.

FIG. 12 is a drawing showing how the base station 1*a* and the surrounding base stations 1*b*, 1*c* communicate with the mobile phone 2. For example, if there is a match between an upstream radio resource used by the base station 1*a* for transmitting signals to a mobile phone with a downstream allocation 2*a*-1 and an upstream radio resource used by the surrounding base station 1*b* for transmitting signals to a mobile phone 2*b*-1 with a downstream allocation, the mobile phone with a downstream allocation 2*b*-1 with which the surrounding base station 1*b* is communicating receives a transmission signal and an interference wave from the base station 1*a* as well as a transmission signal from the surrounding base station 1*b*. In order to prevent this, at the base station 1*a*, when a signal is transmitted to the mobile phone with a downstream allocation 2*a*-1, a null is required to be directed to the mobile phone with a downstream allocation 2*b*-1 communicating with the surrounding base station 1*b*.

On the other hand, with regard to a mobile phone without a downstream allocation 2*b*-2 with which the surrounding base station 1*b* is communicating, because a transmission signal is not received from the surrounding base station 1*b*, at the base station 1*a*, when a signal is transmitted to the terminal with a downstream allocation 2*a*-1, even if a null is not directed to the mobile phone without a downstream allocation 2*b*-2 with which the surrounding base station 1*b* is communicating, this does not become a significant problem.

This is the same with regard to the surrounding base stations 1*b*, 1*c*, and, at the surrounding base station 1*b*, when a signal is transmitted to the mobile phone with a downstream allocation 2*b*-1, a null is required to be directed to the mobile phone with a downstream allocation 2*a*-1 communicating with the base station 1*a*; however, even if a null is not directed to the mobile phone without a downstream allocation 2*a*-2 communicating with the base station 1*a*, this does not become a significant problem. At the surrounding station 1*c*, when a signal is transmitted to a mobile phone with a downstream allocation 2*c*-1, a null is required to be directed to the mobile phone with a downstream allocation 2*a*-1 communicating with the base station 1*a*; however, even if a null is not directed to the mobile phone without a downstream allocation 2*a*-2 communicating with the base station 1*a*, this does not become a significant problem Unlike the embodiment, if the first upstream radio resource for SRS that may be used for SRS transmission transmitted by the mobile phone 2 with a downstream allocation and the second upstream radio resource for SRS that may be used for SRS transmission transmitted by the mobile phone 2 without a downstream allocation are not distinguished and are the same, at the base station 1*a*, for example, an SRS from the mobile phone with a downstream allocation 2*a*-1 with which the base station is communicating, an SRS from the mobile phone with a downstream allocation 2*b*-1 with which the surrounding base station 1*b* is communicating, and an SRS from the mobile phone without a downstream allocation 2*c*-2 with which the surrounding base station 1*c* is communicating, could be transmitted using a same upstream radio resource, that is, using the same transmission band and transmission time frame.

That is, an SRS from the mobile phone with a downstream allocation 2*b*-1 with which the surrounding base station 1*b* is communicating and an SRS from the mobile phone without a downstream allocation 2*c*-2 with which the surrounding base station 1*c* is communicating are sometimes are superimposed as interference waves with respect to an SRS from the mobile phone with a downstream allocation 2*a*-1 with which the base station 1*a* itself is communicating.

For this reason, when the base station 1 performs null steering with regard to the transmission directionality of the array antenna 110 based on the SRS from the mobile phone with a downstream allocation 2*a*-1, there is a possibility that the base station 1*a* will also regard a mobile phone with little need for directing a null (for example, a mobile phone without a downstream allocation with which the surrounding base station 1*c* is communicating) 2*c*-2 as an object to direct a null in addition to a mobile phone to which a null is required to be directed (for example, a mobile phone with a downstream allocation with which the surrounding base station 1*b* is communicating) (2*b*-1).

Herein, the allowable number of nulls in null steering with regard to the transmission directionality of the array antenna 110 depends on the number of antennas 110*a* comprising the array antenna 110. Specifically, if the number of antennas is M, the maximum number of nulls that can be set is (M−1). Therefore, increasing the number of mobile phones to which a null is directed could make it difficult for the base station 1 to direct a null to all the objects.

As described above, if the first upstream radio resource for an SRS and the second upstream radio resource for the SRS are the same, at the base station 1, because there is a possibility of directing a null not only to mobile phones 2 to which a null is required to be directed but also to mobile phones 2 to which a null is hardly required to be directed, when the number of mobile phones 2 to which a null is hardly required to be directed increases, the possibility of failing to direct a null to the mobile phones 2 to which a null is required to be directed becomes higher. This is the same at the surrounding base station 1, increasing the possibility of failing to direct a null to mobile phones 2 to which the null is required to be directed.

Whereas, in the embodiment, because the first upstream radio resource for SRS and the second upstream radio resource for SRS are different, an SRS from the mobile phone 2 without a downstream allocation with which a surrounding base station 1 is communicating is not superimposed as an interference wave at the base station 1 with respect to an SRS from the mobile phone 2 with a downstream allocation with which the base station itself is communicating. Therefore, at the base station 1, mobile phones 2 to which a null is hardly required to be directed do not become objects of directing a null, increasing the possibility of directing a null to mobile phones 2 to which a null is required to be directed.

Thereby, the base station 1 can suppress interference waves affecting the mobile phones 2 communicating with surrounding base stations 1. This is the same at the surrounding base stations 1. Mobile phones 2 to which a null is hardly required to be directed do not become objects of directing a null, increasing the possibility of directing a null to mobile phones 2 to which a null is required to be directed. As a result, it might become possible for the base station 1 to suppress the interference waves received from the surrounding base stations 1.

At each base station 1 according to an embodiment, as described above, when a signal is transmitted to a mobile phone 2 with a downstream allocation, null steering and beam forming with regard to the transmission directionality of the array antenna 110 take place, based on the SRS transmitted by the mobile phone 2 with a downstream allocation. In the embodiment, for example, both null steering and beam forming may be performed using a serially updated algorithm such as RLS (Recursive Least-Squares) algorithm or the like by updating the reception weight a multiple number of times based on a plurality of complex symbols comprised in an SRS and obtaining the transmission weight based on the reception weight after the update. Only null steering may be conducted in the event of transmitting a signal to a mobile phone 2 with a downstream allocation.

A transmission weight is obtained, for example, for each frequency band of one resource block. Hereinafter, the frequency band of one resource block is referred to as an "allocated unit band." For example, if the frequency band of a transmission signal transmitted to an object mobile phone 2 in a downstream sub-frame comprises four allocated unit bands, a transmission weight is obtained with regard to each of the four allocated unit bands. The transmission weight to be applied to a signal transmitted to the object mobile phone 2 using an allocated unit band is obtained, based on twelve complex symbols transmitted using the allocated unit band among a plurality of complex symbols comprising the SRS received from the object mobile phone 2. Because one resource block comprises twelve subcarriers, it is possible to transmit twelve complex symbols using one allocated unit band.

<Allocation Change of an Upstream Radio Source for SRS Transmission with Respect to the Mobile Phone 2>

Next, operations of the base station 1 are described in an event of changing an upstream radio resource for SRS transmission to be allocated by the base station 1 to a mobile phone 2 from an upstream radio sub-resource comprised in the second upstream radio resource for SRS (hereinafter, sometimes referred to as a "second upstream radio sub-resource") to an upstream radio resource comprised in the first upstream radio resource for SRS (hereinafter, sometimes referred to as a "first upstream radio sub-resource").

Figure 13:
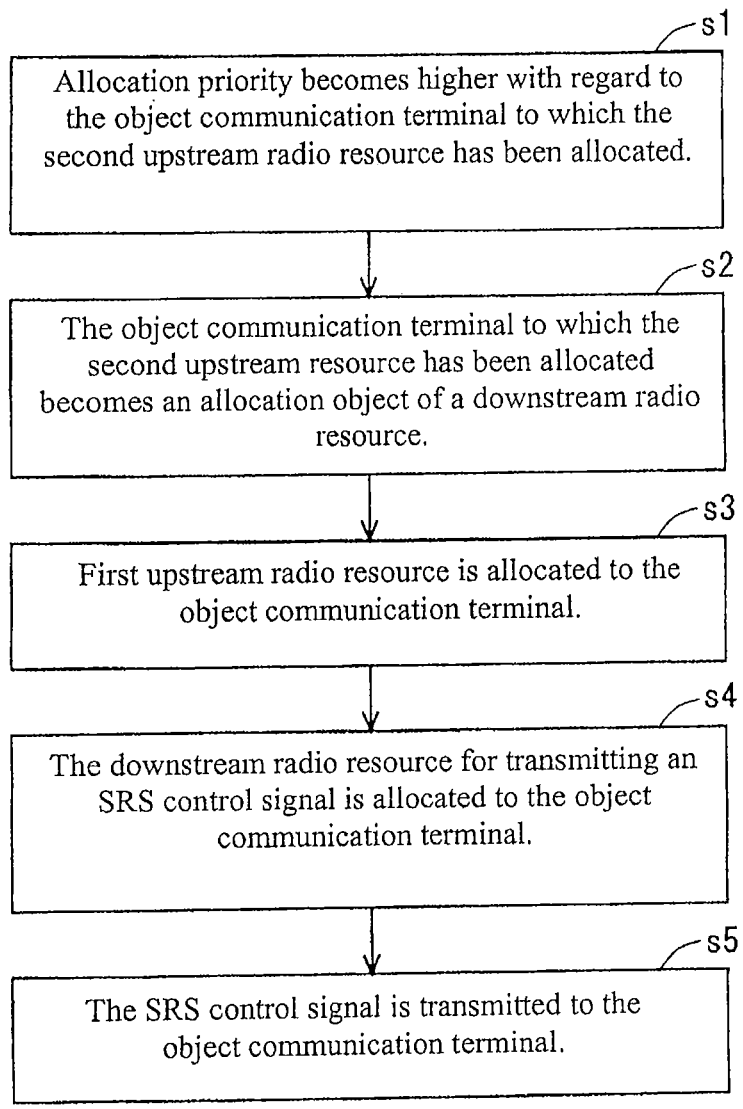
FIG. 13 is an illustration of an exemplary flowchart showing a process for an operation of a base station according to an embodiment of the disclosure.

FIG. 13 is an illustration of an exemplary flowchart showing a process 1300 for an operation of the base station 1 according to an embodiment of the disclosure. The various tasks performed in connection with the process 1300 may be performed by software, hardware, firmware, a computer-readable medium having computer executable instructions for performing the process method, or any combination thereof. The process 1300 may be recorded in a computer-readable medium such as a semiconductor memory, a magnetic disk, an optical disk, and the like, and can be accessed and executed, for example, by a computer CPU such as the control module 12 in which the computer-readable medium is stored.

It should be appreciated that process 1300 may include any number of additional or alternative tasks, the tasks shown in FIG. 13 need not be performed in the illustrated order, and process 1300 may be incorporated into a more comprehensive procedure or process having additional functionality not described in detail herein. In practical embodiments, portions of the process 1300 may be performed by different elements of the system 100/200. Process 1300 may have functions, material, and structures that are similar to the embodiments shown in FIGS. 1-12. Therefore common features, functions, and elements may not be redundantly described here.

In task s1, when the downstream allocation priority becomes higher with respect to an object mobile phone 2 which is a mobile phone 2 without a downstream allocation, to which a second upstream radio resource is allocated, in task s2, the object mobile phone 2 becomes the object of a downstream radio resource allocation. When the object mobile phone 2 becomes the object of the downstream radio resource allocation, in task s3, the radio resource allocation module 122 changes the upstream radio resource for SRS transmission to be allocated to the object mobile phone 2 from the second upstream radio resource to the first upstream radio resource.

Thereafter, with respect to the object mobile phone 2, the transmission signal generating module 120 generates an SRS control signal to inform that the upstream radio resource to be allocated for SRS transmission has been changed from the second upstream radio resource to the first upstream radio resource. That is, with respect to the object mobile phone 2, the transmission signal generating module 120 generates an SRS control signal for notifying the first upstream radio resource newly allocated for SRS transmission. Hereinafter, the SRS control signal is specially referred to as a "SRS control signal for change notice."

Thereafter, in task s4, the radio resource allocation module 122 allocates a downstream radio resource for transmitting, to the object mobile phone 2, the SRS control signal for change notice to the object mobile phone 2. In task s5, the communication module 13 uses the downstream radio resource allocated to the object mobile phone 2 for the transmission of the SRS control signal for change notice and transmits the SRS control signal for change notice to the object mobile phone 2. Subsequently, the communication module 13 may perform beam forming with regard to the transmission directionality of the array antenna 110, based on an SRS without allocation from the object mobile phone 2 so that a beam is directed to the object mobile phone 2. The base station 1 may also simultaneously conduct null steering.

In the communication module 13, because beam forming takes place in the event of transmitting the SRS control signal for change notice to the object mobile phone 2, the radio resource allocation module 122 ensures that when a downstream radio resource for transmitting the SRS control signal for change notice is allocated to the object mobile phone 2, the range of the frequency direction of the downstream radio resource is comprised in the SRS transmission band 450 with regard to an SRS without an allocation from the object mobile phone 2. Subsequently, if there is no available space in the downstream radio resource, at least part of the downstream radio resources allocated to any one of the mobile phones 2 with a downstream allocation is allocated to the object mobile phone 2 as a downstream radio resource for transmitting the SRS control signal for change notice.

Figure 14:
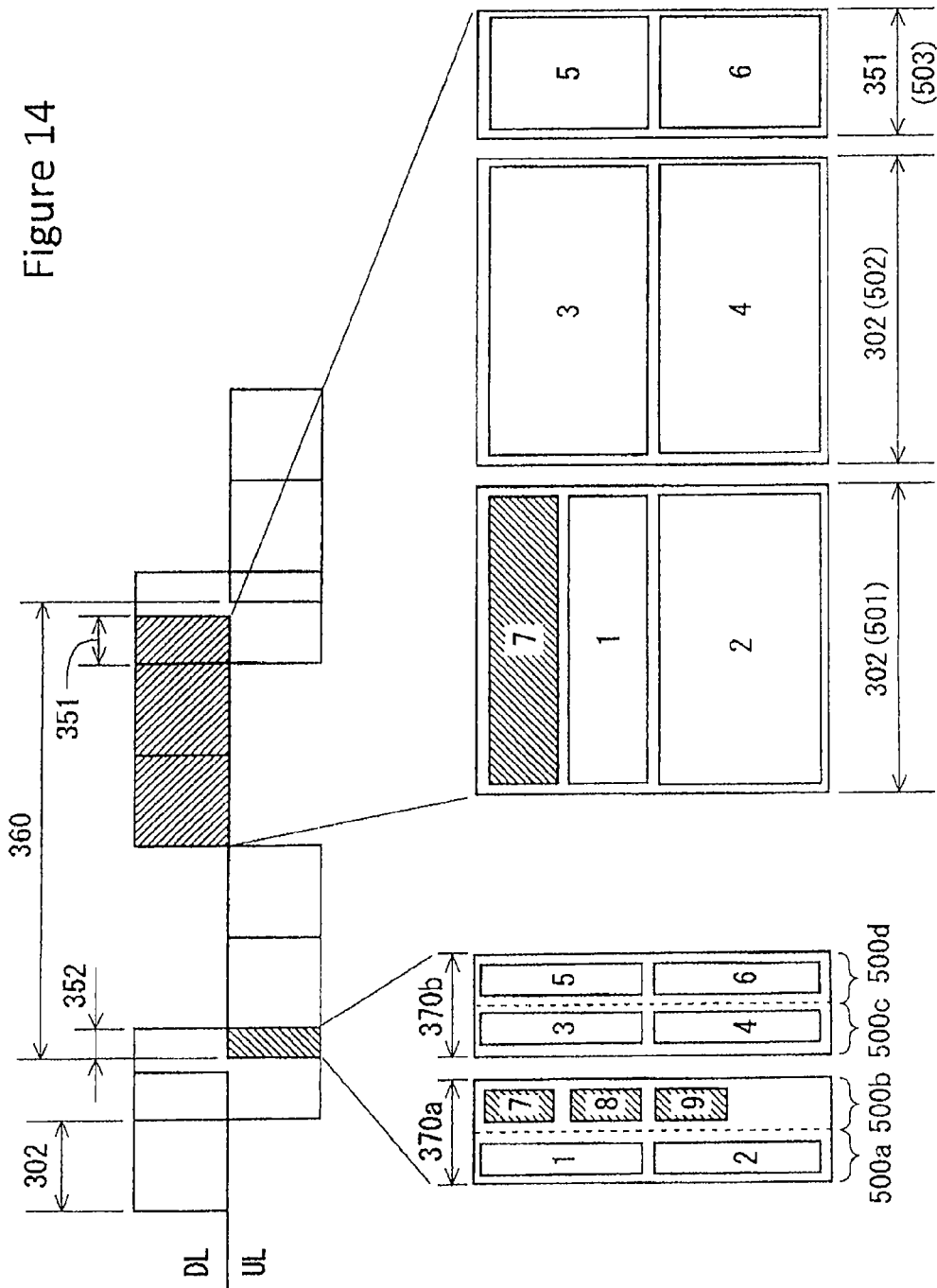
FIG. 14 is a drawing showing an example of an allocation of a downstream radio resource to a mobile phone.

FIG. 14 is a drawing showing an example of the allocation of a downstream radio resource to the mobile phone 2.

In the example of FIG. 14, a mobile phone 2 with a terminal number 7 is an object mobile phone 2. In the example of FIG. 14, in the downstream radio resource allocated to a mobile phone 2 with a terminal number 1 which is a mobile phone 2 with a downstream allocation, a portion including, in the frequency direction, the same frequency band as the SRS transmission band 450 of an SRS transmitted by the mobile phone 2 with a terminal number 7 (a shaded portion of the first downstream sub-frame 501) is allocated to the mobile phone 2 with a terminal number 7 as a downstream radio resource for transmitting an SRS control signal for change notice.

Thereafter, when a response signal is received from the object mobile phone 2, in and onward from a TDD frame 300 following a TDD frame 300 at which the response signal has been received, the base station 1 begins to receive an SRS with an allocation which is an SRS transmitted from the object mobile phone 2 using the first upstream radio resource. The base station 1 controls the transmission directionality of the array antenna 110 based on the received SRS and transmits a signal to the object mobile phone 2 in a downstream sub-frame.

As described above, at the base station 1, when an SRS control signal for change notice is transmitted to a mobile phone 2 from which an SRS without an allocation is transmitted, the transmission directionality of the array antenna 110 is controlled, based on the SRS without an allocation. As described above, because the second upstream radio resource for SRS that may be used for transmitting an SRS without an allocation is different from the first upstream radio resource for SRS that may be used for transmitting an SRS with an allocation, the SRS with an allocation from the terminal 2 with a downstream allocation transmitted by a surrounding base station 1 is not superimposed as an interference wave on the SRS without an allocation transmitted from a mobile phone 2 with which the base station 1 is communicating.

Therefore, when each base station 1 transmits an SRS control signal for change notice with respect to the mobile phone 2, even when null steering is performed, it is not possible to intentionally direct a null to a terminal 2 with a downstream allocation with which a surrounding base station 1 is communicating. Therefore, there is not much advantage to performing null steering in the event of transmitting an SRS control signal for change notice to the mobile phone 2. On the other hand, when both beam forming and null steering are performed, the beam gain tends to be smaller in comparison to the case in which only beam forming is performed. For this reason, ideally only beam forming is performed between beam forming and null steering in the event of transmitting an SRS control signal for change notice to the mobile phone 2.

Next, an upstream radio resource for transmitting an SRS to be allocated by the base station 1 to the mobile phone 2 is described regarding operations of the base station 1 in the event of changing from the first upstream radio resource to the second upstream radio resource.

Figure 15:
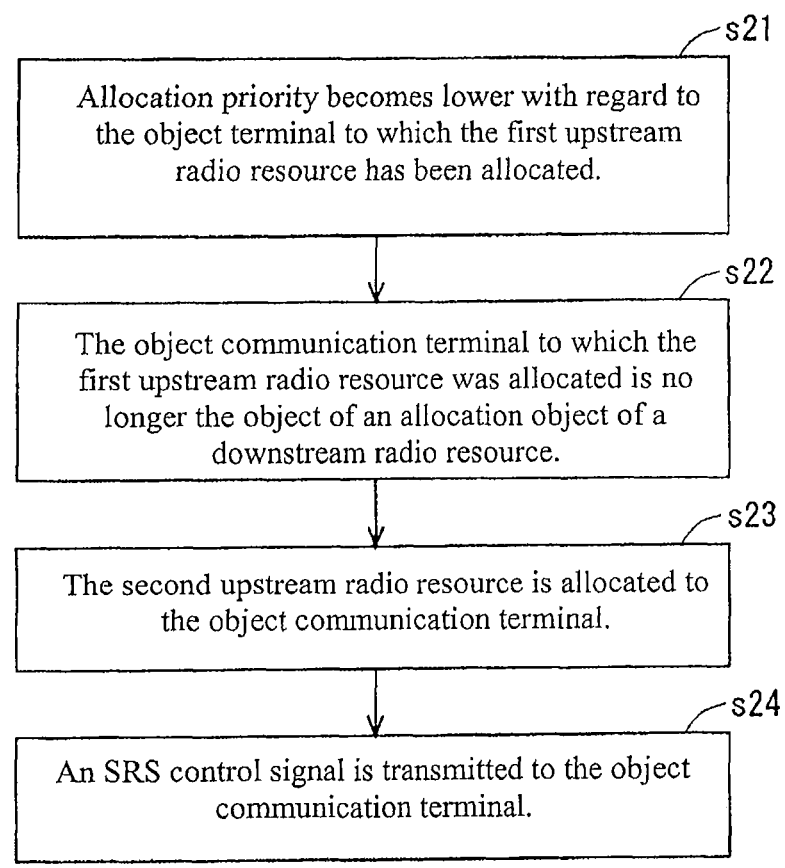
FIG. 15 is an illustration of an exemplary flowchart showing a process for an operation of a base station according to an embodiment of the disclosure.

FIG. 15 is an illustration of an exemplary a flowchart showing an process 1500 for operation of a base station according to an embodiment of the disclosure. The various tasks performed in connection with the process 1500 may be performed by software, hardware, firmware, a computer-readable medium having computer executable instructions for performing the process method, or any combination thereof. The process 1500 may be recorded in a computer-readable medium such as a semiconductor memory, a magnetic disk, an optical disk, and the like, and can be accessed and executed, for example, by a computer CPU such as the control module 12 in which the computer-readable medium is stored.

It should be appreciated that process 1500 may include any number of additional or alternative tasks, the tasks shown in FIG. 15 need not be performed in the illustrated order, and process 1500 may be incorporated into a more comprehensive procedure or process having additional functionality not described in detail herein. In practical embodiments, portions of the process 1500 may be performed by different elements of the system 100/200. Process 1500 may have functions, material, and structures that are similar to the embodiments shown in FIGS. 1-12 and 14. Therefore common features, functions, and elements may not be redundantly described here.

In task s21, the downstream allocation priority becomes low with regard to an object mobile phone 2 which is a mobile phone 2 with a downstream allocation to which the first upstream radio source has been allocated for SRS transmission and, in task s22, the object mobile phone 2 is no longer an allocation object of a downstream radio resource. In task s23, the radio resource allocation module 122 changes the upstream radio resource for transmitting an SRS that is to be allocated to the object mobile phone 2 from the first upstream radio resource to the second upstream radio resource. Thereafter, the transmission signal generating module 120 generates an SRS control signal for notifying the object mobile phone 2 that the upstream radio resource to be allocated as an SRS transmission has been changed from the first upstream radio resource to the second upstream radio resource. That is, the transmission signal generating module 120 generates a new SRS control signal for notifying the second upstream radio resource that has been newly allocated as an SRS transmission with respect to the object mobile phone 2.

Thereafter, in task s24, the communication module 13 transmits the newly generated SRS control signal to the object mobile phone 2. Then, the communication module 13 transmits the new SRS control signal to the object mobile phone 2 using a downstream radio resource that has already been allocated to the object mobile phone 2. In an event of transmitting the new SRS control signal to the objective mobile phone 2, the communication module 13 performs null steering and beam forming based on the SRS with an allocation from the object mobile phone 2.

Subsequently, when a response signal is received from the object mobile phone 2, the base station 1 begins to receive an SRS without an allocation from the object mobile phone 2 in and onward from a TDD frame 300 following a TDD frame 300 at which the response signal has been received, and no longer transmits a signal to the object mobile phone 2.

<Regarding the Transmission Frequency Bandwidth of SRS Without an Allocation>

As described above, in the communication system 100, a plurality of bandwidths mutually different in size (in the present example: 40 RB, 20 RB, and 4 RB) have been prescribed as bandwidths that can be set as SRS transmission bandwidths. The SRS transmission bandwidth for an SRS without an allocation may be set to be any of the plurality of bandwidths.

If the smallest value (4 RB in the present example) among the plurality of bandwidths has been set as the SRS transmission bandwidth for an SRS without an allocation, the second upstream radio resource for SRS that can be used for transmitting the SRS without an allocation, that is, the upstream radio resource for anterior SRS1 500b, is used to make it possible for many mobile phones 2 without a downstream allocation to transmit an SRS to the base station 1. Thereby, the number of mobile phones 2 without a downstream allocation with which the base station 1 can communicate may be increased. As a result, the number of mobile phones 2 housed at the base station 1 increases.

Figure 16:
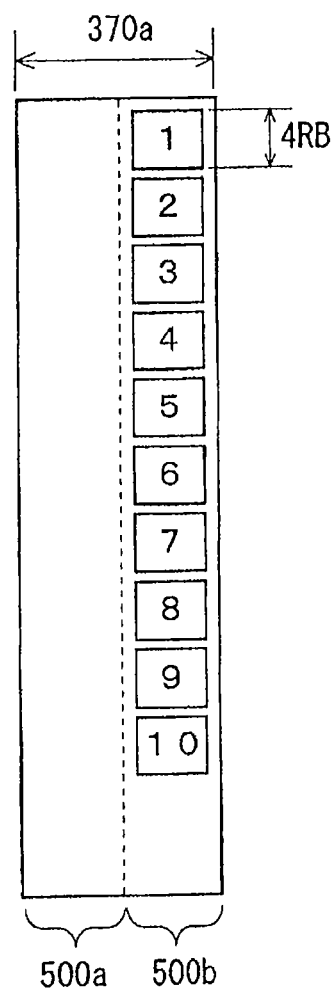
FIG. 16 is a drawing showing a situation in which an SRS transmission bandwidth of an SRS without an allocation has been set to be 4 RB.

FIG. 16 is a drawing showing a situation in which the SRS transmission bandwidth of an SRS without an allocation has been set to be 4 RB. If the system bandwidth is 10 MHz, when the SRS transmission bandwidth of the SRS without an allocation is set to be 4 RB without multiplexing the SRS without an allocation, the upstream radio resource for the anterior SRS1 500b is used and ten units of the mobile phones 2 (mobile phones 2 with terminal numbers 1 to 10) can transmit an SRS without an allocation.

At the base station 1, with respect to a mobile phone 2 to which an SRS without an allocation is transmitted, a signal is not transmitted by controlling the transmission directionality of the array antenna 110 based on the SRS without an allocation other than transmitting an SRS control signal for change notice, causing no problem even if the SRS transmission bandwidth for the SRS without an allocation is set small.

<Regarding Multiplexing of SRS>

As described above, in an SRS, eight kinds of symbol patterns in which eight kinds of mutually orthogonal symbol systems have been adopted, have been provided. An SRS with an allocation or an SRS without an allocation transmitted by the plurality of mobile phones 2 may be multiplexed or does not have to be multiplexed in the same transmission band.

If an SRS with an allocation transmitted by the plurality of mobile phones 2 communicating with the base station 1 is multiplexed, because the probability of directing a null to a mobile phone 2 to which the null is required to be directed becomes low at a surrounding base station 1, ideally the SRS with an allocation is not multiplexed.

Figure 17:
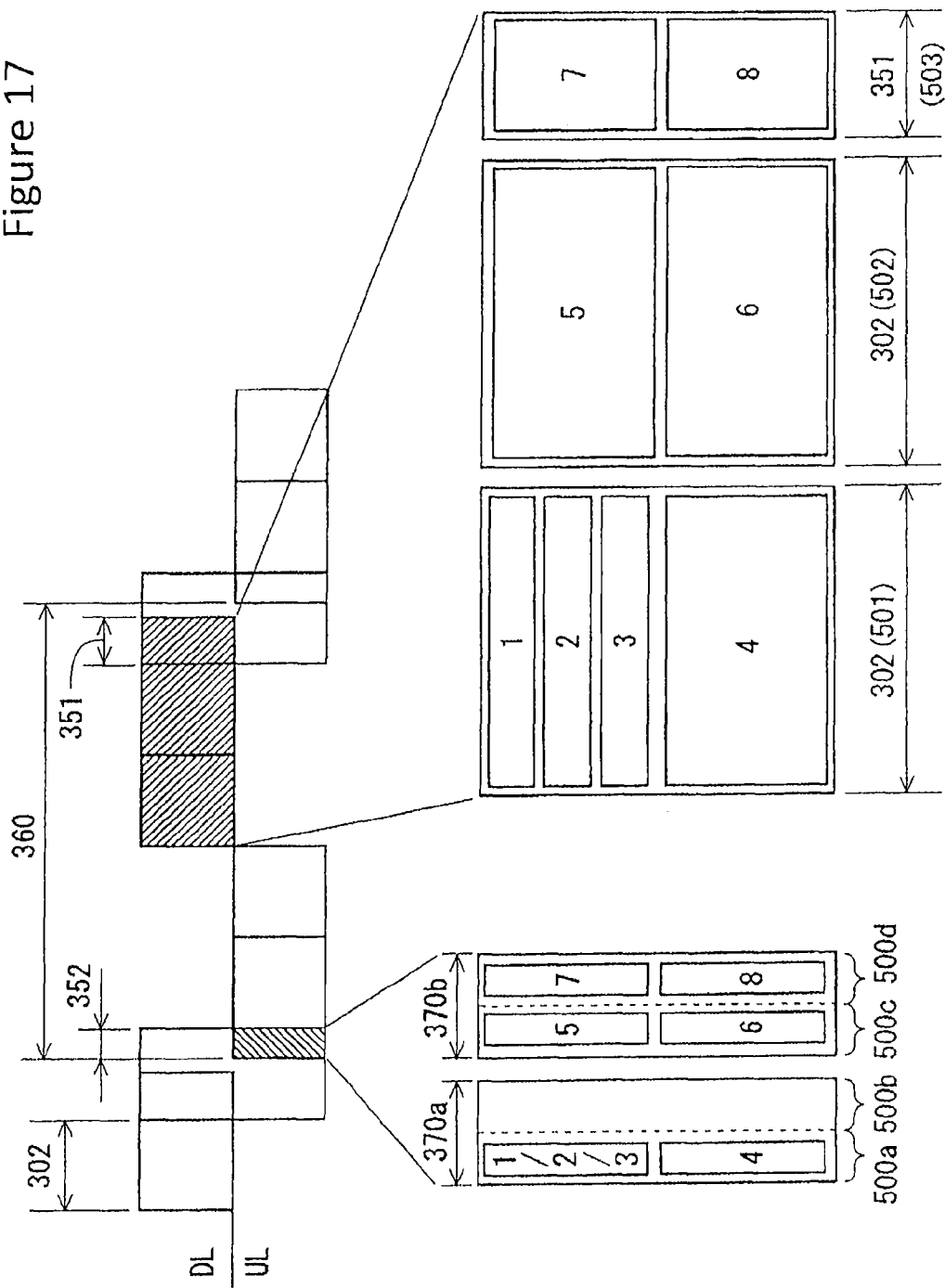
FIG. 17 is a drawing showing an example of an allocation of a downstream radio resource with respect to a mobile phone.

FIG. 17 is a drawing showing an example of an allocation of a downstream radio resource with respect to the mobile phone 2. In the example of FIG. 17, an SRS with an allocation transmitted using an upstream radio resource comprised in the upstream radio resource for the anterior SRS0 500a is multiplexed with regard to the mobile phones 2 with terminal numbers 1 to 3.

Even if the SRS with an allocation transmitted by the mobile phones 2 with terminal numbers 1 to 3 has been multiplexed in an SRS transmission cycle 360, the signals cannot be transmitted to all of the mobile phones 2 with terminal numbers 1 to 3 using the same frequency band in the first downstream sub-frame 501 of the SRS transmission cycle. That is, in the first downstream sub-frame 501, even if an attempt is made to transmit signals to all of the mobile phones 2 with terminal numbers 1 to 3, transmission signals to all of the mobile phones 2 with terminal numbers 1 to 3 are transmitted in mutually different frequency bands.

On the other hand, in a surrounding base station 1, when a mobile phone 2 communicating with the former, for example, a mobile phone 2 with terminal number 10 transmits an SRS with an allocation in the same transmission frequency band and the same transmission time frame as an SRS with an allocation transmitted by mobile phones with terminal numbers 1 to 3 communicating with the base station 1, the surrounding base station 1 ends up receiving the SRS with an allocation from the mobile phone 2 with terminal number 10 in a state affected by the interference of the SRS with an allocation transmitted by the mobile phones 2 with terminal numbers 1 to 3. Therefore, in this case, at the surrounding base station 1, all the mobile phones 2 with terminal numbers 1 to 3 communicating with the base station 1 become objects to which a null is directed.

Among frequency bands comprised in the transmission frequency band of an SRS with an allocation transmitted by the terminal numbers 1 to 3, if one specific frequency band is focused, in the focused frequency band, a signal is transmitted from the base station 1 to only one mobile phone 2 among mobile phones 2 with terminal numbers 1 to 3. Therefore, a mobile phone 2 with terminal number 10 communicating with a surrounding base station 1 only receives a signal from any one mobile phone among mobile phones 2 with terminal numbers 1 to 3 in the focused frequency band. Thereby, in the focused frequency band, there is little need for the surrounding base station 1 to direct a null to all mobile phones 2 with terminal numbers 1 to 3. Nevertheless, all the mobile phones 2 with terminal numbers 1 to 3 communicating with the base station 1 become objects to direct a null at the surrounding base station 1. That is, when an SRS with an allocation transmitted by the mobile phones 2 with terminal numbers 1 to 3 is multiplexed, there is a possibility at the surrounding base station 1 that a null could be directed to a mobile phone 2 with little need for directing a null. Therefore, the possibility of a null being directed to a mobile phone 2 with the need of a null to be directed to becomes low at the surrounding base station 1.

As described above, if an SRS with an allocation is multiplexed, because the possibility of directing a null to a mobile phone 2 with the need of directing a null to is reduced, an SRS with an allocation is ideally not multiplexed.

Figure 18:
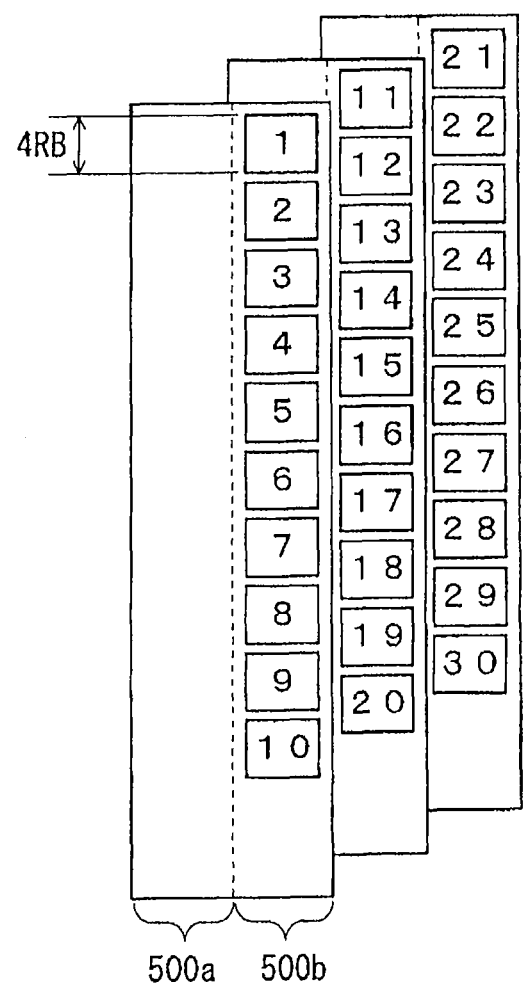
FIG. 18 is a drawing showing a situation in which triple-multiplexing of an SRS without an allocation has taken place in a same frequency band.

On the other hand, because an SRS without an allocation does not interfere with an SRS with an allocation transmitted by a mobile phone 2 with which a surrounding base station 1 is communicating, such a problem as above might not be caused. Therefore, in order to increase the number of mobile phones 2 without a downstream allocation with which the base station 1 can communicate (that is, to increase the number of mobile phones 2 that the base station 1 can house therein), it is ideal to allow multiplexing of SRS without an allocation. FIG. 18 is a drawing showing a situation in which triple-multiplexing of SRS without an allocation has taken place in the same frequency band. If an SRS transmission bandwidth of an SRS without an allocation is 4 RB and an SRS without an allocation is subjected to triple-multiplexing, the base station 1 may house thirty units of communication terminals 2 without a downstream allocation (in the example in FIG. 18, mobile phones 2 with a terminal number 1 to 30). In the embodiment, because an SRS with an allocation transmitted by a maximum of eight mobile phones 2 may be multiplexed in the same transmission frequency band, if the SRS transmission bandwidth of an SRS without an allocation is 4 RB, the base station 1 is able to house eighty units of terminal 2 without a downstream allocation.

<Modification Example>

In an embodiment, the upstream radio resource 500b for the anterior SRS1 was the second upstream radio resource for SRS that may be used by a mobile phone 2 without a downstream allocation to transmit an SRS; however, any one of the upstream radio resource for the anterior SRS0 500a, the upstream radio resource for the posterior SRS0 500c, and the upstream radio resource for the posterior SRS1 500d may also be the second upstream radio resource for SRS.

An SRS is transmitted in each of two symbol periods 304 of the upstream pilot time slot 352 in the embodiment; however, an SRS may also be transmitted in only one of the two symbol periods 304. In this case, either an upstream radio resource which is an upstream radio resource comprised in the SRS transmittable band 400 and specified by the symbol period 304 in which an SRS is transmitted and by a plurality of subcarriers SC0 in a pectinate form that can be used to transmit an SRS0, or an upstream radio resource which is an upstream radio resource comprised in the SRS transmittable band 400 and specified by the symbol period 304 in which an SRS is transmitted and by a plurality of subcarriers SC1 in a pectinate form that can be used to transmit an SRS1, becomes the first upstream radio resource for SRS, while the other becomes the second upstream radio resource for SRS. The first and second upstream radio resources for SRS are different in their frequency directions.

As described above, an SRS may also be transmitted in the last symbol period 304 of the upstream sub-frame 302, making it possible to use SRS0 and SRS1 transmitted from the last symbol period 304 of the upstream sub-frame 302 instead of SRS0 and SRS1 transmitted from one of two symbol periods 304 of the upstream pilot time slot 352. It is also possible to use, as an SRS with an allocation, one of SRS0 or SRS1 transmitted in the last symbol period 304 of the upstream sub-frame 302, while using the other as an SRS without an allocation. When an SRS is transmitted to the last symbol period 304 of the upstream sub-frame 302, only the center portion of the system band can be used. For example, if the system band is 10 MHz, 5 RB from the end on the high frequency side and 5 RB from the end on the low frequency side cannot be used for SRS transmission in the system band.

In the above example, both SRS0 and SRS1 are used; however, only one of them may be used. In this case, for example, either an upstream radio resource characterized by the anterior SRS transmission symbol period 370a and by a plurality of subcarriers in a pectinate form that can be used for transmitting an object SRS to be used, comprised in the SRS transmittable band 400, or an upstream radio resource characterized by the posterior SRS transmission symbol period 370b and by a plurality of sub-carries in a pectinate form that can be used for transmitting an object SRS to be used, comprised in the SRS transmittable band 400 becomes the first upstream radio resource for SRS, while the other becomes the second upstream radio resource for SRS. In this case, the first and second upstream radio resources for SRS become different in the temporal direction.

In this document, the terms "computer program product", "computer-readable medium", and the like may be used generally to refer to media such as, for example, memory, storage devices, or storage unit. These and other forms of computer-readable media may be involved in storing one or more instructions for use by the control module 12 to cause the control module 12 to perform specified operations. Such instructions, generally referred to as "computer program code" or "program code" (which may be grouped in the form of computer programs or other groupings), when executed, enable a communication method of the systems 100 and 200.

Terms and phrases used in this document, and variations hereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future.

Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise.

Furthermore, although items, elements or components of the present disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent. The term "about" when referring to a numerical value or range is intended to encompass values resulting from experimental error that can occur when taking measurements.

The invention claimed is:

1. A communication device for use in a communication system, the communication device comprising:
   a plurality of antennas;
   a communication module operable to: communicate with at least one communication terminal using the antennas; and control a transmission directionality of the antennas based on a received previously known signal transmitted from a communication terminal, when transmitting a signal to the communication terminal; and
   a radio resource allocation module operable to: allocate a first upstream radio sub-resource, to be used for transmitting the received previously known signal, to a first communication terminal to which a downstream radio resource is to be allocated, a first upstream radio resource for a first previously known signal comprising the first upstream radio sub-resource; and allocate a second upstream radio sub-resource, to be used for transmitting the received previously known signal, to a second communication terminal to which a downstream radio resource is not to be allocated, a second upstream radio resource for a second previously known signal comprising the second upstream radio sub-resource, wherein the radio resource allocation module is further operable to change an upstream radio resource to be allocated to a third communication terminal from the first upstream radio sub-resource to the second upstream radio sub-resource, when an allocation of a downstream radio resource is cancelled with respect to the third communication terminal to which the first upstream radio resource has been allocated.

2. The communication device according to claim 1, wherein a first frequency direction of the first upstream radio resource and a second frequency direction of the second upstream radio resource are different.

3. The communication device according to claim 1, wherein a first temporal direction of the first upstream radio resource and a second temporal direction of the second upstream radio resource are different.

4. The communication device according to claim 1, wherein the communication module is further operable to execute null steering of the transmission directionality of the antennas based on the received previously known signal, when transmitting a signal to the first communication terminal using the first upstream radio resource.

5. The communication device according to claim 1, wherein: the communication module is further operable to receive a plurality of received previously known signals multiplexed in a same frequency band from a plurality of communication terminals.

6. The communication device according to claim 1, wherein: the radio resource allocation module is further operable to change an upstream radio source to be allocated from the second upstream radio sub-resource to the first upstream radio sub-resource.

7. The communication device according to claim 1, wherein:
   the communication module is futher operable to execute beam forming based on the received previously known signal from a fourth communication terminal to direct the beam to the fourth communication terminal, when a signal to notify an allocation change of an upstream radio resource is sent for the fourth communication terminal for which an upstream radio resource to be allocated for transmission of the received previously known signal has changed from the second upstream radio sub-resource to the first upstream radio sub-resource.

8. A method for operating a communication system, the method comprising:
   controlling a transmission directionality of a plurality of antennas based on a received previously known signal transmitted from a communication terminal, when transmitting a signal to the communication terminal;
   allocating a first upstream radio sub-resource, to be used for transmitting the received previously known signal, to a first communication terminal to which a downstream radio resource is to be allocated, a first upstream radio resource for a first previously known signal comprising the first upstream radio sub-resource;
   allocating a second upstream radio sub-resource, to be used for transmitting the received previously known signal, to a second communication terminal to which a downstream radio resource is not to be allocated, a second upstream radio resource for a second previously known signal comprising the second upstream radio sub-resource; and changing an upstream radio resource to be allocated to a third communication terminal from the first upstream radio sub-resource to the second upstream radio sub-resource, when an allocation of a downstream radio resource is cancelled with respect to the third communication terminal to which the first upstream radio resource has been allocated.

9. The method according to claim 8, wherein a first frequency direction of the first upstream radio resource and a second frequency direction of the second upstream radio resource are different.

10. The method according to claim 8, wherein a first temporal direction of the first upstream radio resource and a second temporal direction of the second upstream radio resource are different.

11. A non-transitory computer readable storage medium comprising computer-executable instructions for operating a communication system, the method executed by the computer-executable instructions comprising:

controlling a transmission directionality of a plurality of antennas based on a received previously known signal transmitted from a communication terminal, when transmitting a signal to the communication terminal;

allocating a first upstream radio sub-resource, to be used for transmitting the received previously known signal, to a first communication terminal to which a downstream radio resource is to be allocated, a first upstream radio resource for a first previously known signal comprising the first upstream radio sub-resource;

allocating a second upstream radio sub-resource, to be used for transmitting the received previously known signal, to a second communication terminal to which a downstream radio resource is not to be allocated, a second upstream radio resource for a second previously known signal comprising the second upstream radio sub-resource; and changing an upstream radio resource to be allocated to a third communication terminal from the first upstream radio sub-resource to the second upstream radio sub-resource, when an allocation of a downstream radio resource is cancelled with respect to the third communication terminal to which the first upstream radio resource has been allocated.

12. The non-transitory computer readable storage medium according to claim 11, wherein a first frequency direction of the first upstream radio resource and a second frequency direction of the second upstream radio resource are different.

13. The non-transitory computer readable storage medium according to claim 11, wherein a first temporal direction of the first upstream radio resource and a second temporal direction of the second upstream radio resource are different.

* * * * *